(12) United States Patent
Aslandere et al.

(10) Patent No.: US 12,172,530 B2
(45) Date of Patent: Dec. 24, 2024

(54) DRIVE THROUGH LOW-EMISSION-ZONES: A CONNECTED SYSTEM TO REDUCE EMISSIONS

(71) Applicant: Ford Global Technologies, LLC, Dearborn, MI (US)

(72) Inventors: Turgay Aslandere, Aachen (DE); Omer Kirbaci, Nettetal (DE); Frederik De Smet, Zonhoven (BE); Daniel Roettger, Eynatten (BE)

(73) Assignee: Ford Global Technologies, LLC, Dearborn, MI (US)

( * ) Notice: Subject to any disclaimer, the term of this patent is extended or adjusted under 35 U.S.C. 154(b) by 510 days.

(21) Appl. No.: 17/199,238

(22) Filed: Mar. 11, 2021

(65) Prior Publication Data
US 2021/0285779 A1    Sep. 16, 2021

(30) Foreign Application Priority Data

Mar. 11, 2020    (DE) .......................... 102020106591.4

(51) Int. Cl.
*B60L 50/15*    (2019.01)
*B60L 58/13*    (2019.01)
(Continued)

(52) U.S. Cl.
CPC .............. *B60L 50/15* (2019.02); *B60L 58/13* (2019.02); *B60W 10/06* (2013.01); *B60W 10/08* (2013.01); *B60W 20/16* (2016.01); *B60W 20/20* (2013.01); *G01C 21/3461* (2013.01); *G01C 21/3469* (2013.01); *G06N 3/08* (2013.01); *H04W 4/40* (2018.02); *B60W 2756/10* (2020.02)

(58) Field of Classification Search
CPC .. B60W 20/00; B60W 20/16; B60W 2756/10; B60K 6/00; F02D 29/02; H04W 4/38–48; G07C 5/00; G08G 1/00; G05D 1/00; F02P 9/005; G06N 3/02–105
See application file for complete search history.

(56) References Cited

U.S. PATENT DOCUMENTS 7,062,371 B2    6/2006    Gault et al.
8,781,668 B1    7/2014    Kozloski et al.
(Continued)

FOREIGN PATENT DOCUMENTS

CN    106774272 A    5/2017
DE    102017203015 A1 *    8/2018
(Continued)

OTHER PUBLICATIONS

Cassebaum—English Description of DE-102017203015-A1 via Espacenet Patent Translate, retrieved Aug. 25, 2023. (Year: 2023).*
(Continued)

*Primary Examiner* — Rami Khatib
*Assistant Examiner* — Paul Allen
(74) *Attorney, Agent, or Firm* — Vincent Mastrogiacomo; McCoy Russell LLP

(57) ABSTRACT

Methods and systems are provided for adjusting a vehicle powertrain. In one example, a vehicle powertrain is adjusted in response to an emission limit of an emission zone. Adjustments may be provided via a neural network wirelessly connected to a vehicle controller.

9 Claims, 11 Drawing Sheets

(51) Int. Cl.
*B60W 10/06* (2006.01)
*B60W 10/08* (2006.01)
*B60W 20/16* (2016.01)
*B60W 20/20* (2016.01)
*G01C 21/34* (2006.01)
*G06N 3/08* (2023.01)
*H04W 4/40* (2018.01)

(56) References Cited

U.S. PATENT DOCUMENTS

| | | | |
|---|---|---|---|
| 2001/0029431 A1* | 10/2001 | Ito | G01C 21/28 |
| | | | 701/472 |
| 2004/0162644 A1* | 8/2004 | Torii | G06N 3/045 |
| | | | 701/1 |
| 2007/0187953 A1* | 8/2007 | Park | B60H 1/3222 |
| | | | 290/28 |
| 2010/0017236 A1* | 1/2010 | Duddle | G06Q 40/08 |
| | | | 701/1 |
| 2011/0106401 A1* | 5/2011 | Kumar | B61L 3/006 |
| | | | 701/102 |
| 2012/0314754 A1* | 12/2012 | Haran | H04L 27/2656 |
| | | | 375/232 |
| 2014/0310206 A1* | 10/2014 | Budiscak | F02D 41/2441 |
| | | | 706/11 |
| 2015/0152769 A1* | 6/2015 | Aoki | F02D 41/0235 |
| | | | 73/114.75 |
| 2015/0240729 A1* | 8/2015 | Shimizu | F02D 41/0055 |
| | | | 60/285 |
| 2016/0144764 A1* | 5/2016 | Dutta | B60H 1/00364 |
| | | | 62/64 |
| 2016/0252031 A1* | 9/2016 | Nagatsu | F02D 41/04 |
| | | | 123/305 |
| 2018/0286145 A1* | 10/2018 | Lindelöf | B60K 28/02 |
| 2019/0242318 A1* | 8/2019 | Kitagawa | G06N 3/084 |
| 2019/0306282 A1* | 10/2019 | Masputra | G06F 9/44526 |

FOREIGN PATENT DOCUMENTS

| | | | |
|---|---|---|---|
| FR | 2941424 A1 * | 7/2010 | B60K 6/46 |
| KR | 101631235 B1 * | 6/2016 | |
| WO | 2017149281 A1 | 9/2017 | |

OTHER PUBLICATIONS

Hennequet—English Description of FR-2941424-A1 via Espacenet Patent Translate, retrieved Aug. 25, 2023. (Year: 2023).*

Kim—English Description of KR-101631235-B1 via Espacenet Patent Translate, retrieved Aug. 25, 2023. (Year: 2023).*

Vadamalu, R. et al., "Methodology for model-based development, validation and calibration of connected electrified powertrain systems," Proceedings of CoFAT 2016—Conference on Future Automotive Technology, May 3, 2016, Munich, Germany, 8 pages.

Martinez, C. et al., "Energy Management in Plug-in Hybrid Electric Vehicles: Recent Progress and a Connected Vehicles Perspective," IEEE Transaction on Vehicular Technology, vol. 66, No. 6, Jun. 21, 2016, 16 pages.

Willems, F., "The self-learning powertrain: towards smart and green transport," Technische Universiteit Eindhoven, Mar. 24, 2017, 35 pages.

* cited by examiner

DRIVE THROUGH LOW-EMISSION-ZONES: A CONNECTED SYSTEM TO REDUCE EMISSIONS

CROSS-REFERENCE TO RELATED APPLICATIONS

The present application claims priority to German Patent Application No. 102020106591.4 filed on Mar. 11, 2020. The entire contents of the above-listed application is hereby incorporated by reference for all purposes.

FIELD

The present description relates generally to a trained artificial neural network for predicting emission data.

BACKGROUND/SUMMARY

Some areas may include restricted zones with emissions restrictions to reduce air pollution, for example to keep nitrogen oxide concentrations below a threshold $NO_x$ value. Electric and hybrid vehicles may be increasingly desired to help meet the predetermined limit value. However, costs for electric and hybrid vehicles may still be higher, on average, than vehicles with only internal combustion engines, especially for large vehicles, such as for off-road vehicles (SUVs) or trucks. Therefore, to meet the predetermined limit value in the short-term until electric and hybrid vehicles are competitively priced, car manufacturers may be trying to develop strategies in the form of calibrations that can be used to curb the emission of air pollutants. Such calibrations may be determined experimentally and take into account numerous parameters, such as outside temperature, pressure conditions, etc.

For example, the formation and emission of nitrogen oxides may be reduced by lowering an engine temperature during the combustion process or implementing various exhaust gas aftertreatment processes. However, this may lead to a loss of performance and efficiency and possibly even an increase in carbon dioxide emissions.

Regulations may be less strict outside the restricted zones, and nitrogen oxide emissions may be increased, but the reduction of carbon dioxide emissions and nitrogen oxide emissions may be desired at all times due to global warming.

Numerous approaches to optimizing air pollutant emission behavior are known. Thus, in Vadamalu, R. S., Thiem, M., Beidl, C. Methodology for model-based development, validation, and calibration of connected electrified powertrain systems, Conference on Future Automotive Technology, 2016 an approach is presented for hybrid vehicles based on a consistent model-based environment for the development, validation, and calibration of drive systems with variable degrees of hybridization.

Willems, F. P. T., The self-learning powertrain: towards smart and green transport, Eindhoven: Technical Universiteit Eindhoven, 2017 proposes an intelligent powertrain in which real-time models are integrated into the control system and where the control is carried out predictively (adaptive control).

Martinez, C. M., Hu, X., Cao, D., Velenis, E., Gao, B., Wellers, M. Energy Management in Plug-in Hybrid Electric Vehicles: Recent Progress and a Connected Vehicles Perspective, IEEE transactions on vehicular technology connected vehicles series, 2016 provides an overview of the advantages and disadvantages of various methods for optimizing energy management systems for plug-in hybrid vehicles.

In WO 2017/149 281 A1, a vehicle is known which can be operated in two different operating modes with different air pollutant emissions, wherein switching to the operating mode with lower air pollutant emissions is automatic if the vehicle is in a zone with restrictions for reducing air pollution. In addition, measurement data can be collected and transmitted to an external server and processed thereon. The vehicle can receive an optimized engine control strategy from the server.

In U.S. Pat. No. 8,781,668 B1, a method is disclosed in which the engine control strategy is determined depending on the vehicle location and for the emission data stored for that location. Other parameters, such as time of day, weather conditions, vehicle mass, etc. can be included.

CN 1 06 774 272 A describes a cloud computing platform that provides an optimized engine control strategy to a vehicle control unit. The cloud computing platform retrieves real-time data from vehicle sensors, location information, other vehicle data, etc. Based on the data received, the cloud computing platform updates the optimized engine control strategy to achieve energy savings and emission reductions.

U.S. Pat. No. 7,062,371 B2 discloses a method including determining a location of a vehicle, determining a current emission zone based on the location of the vehicle, determining at least one location-specific emission parameter based on the current emission zone, and modifies at least one vehicle function based on the location-specific emission parameter.

Thus, there is a demand for enhanced vehicle control, so that on the one hand the emission of air pollutants can be changed according to zone limits and on the other hand performance and efficiency of the vehicle are affected as little as possible.

In one example, the issues described above may be addressed by a method for determining a location of a vehicle, determining an emission limit of the location, and adjusting operating parameters of the vehicle based on a plurality of outputs from a trained neural network.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
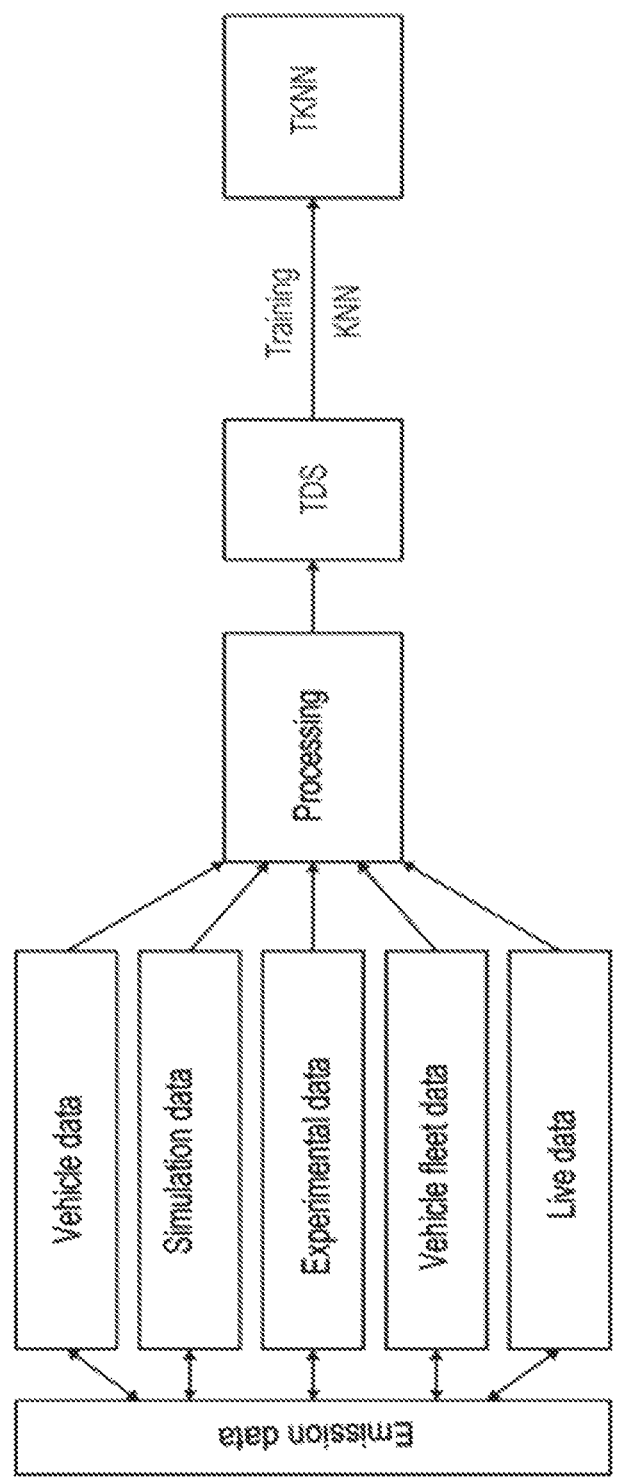
FIG. 1 shows a schematic representation of a training phase.
Figure 2:
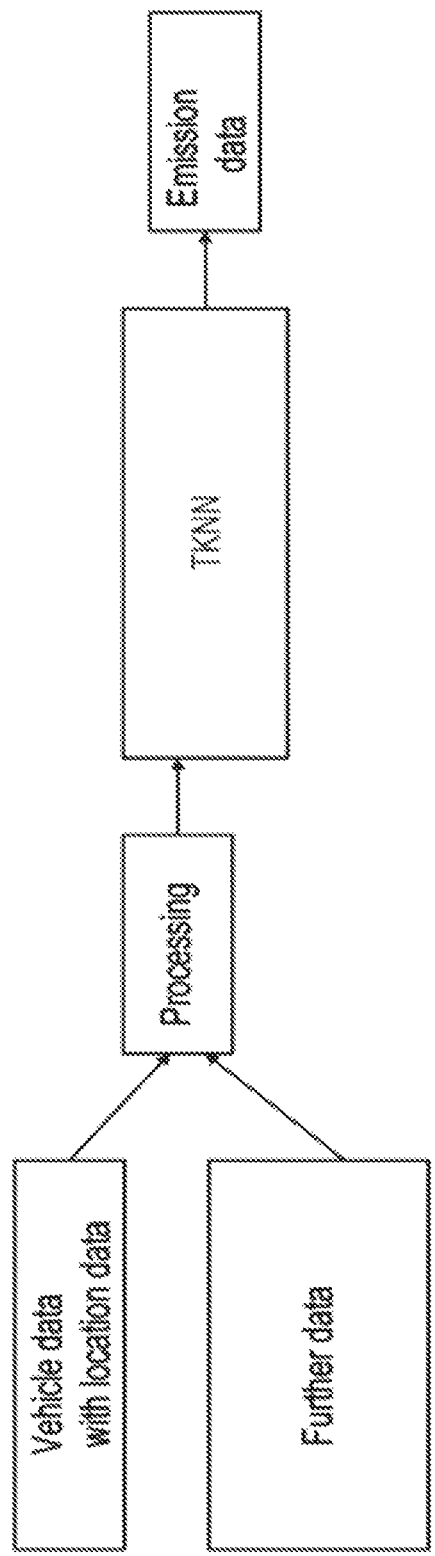
FIG. 2 shows a schematic representation of a prediction phase.
Figure 3:
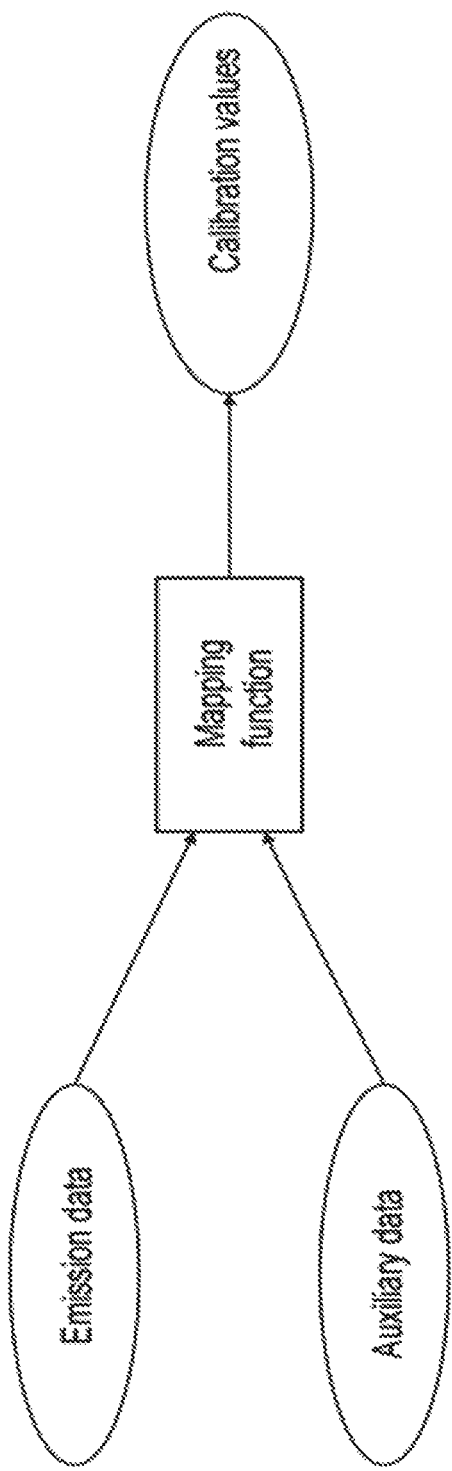
FIG. 3 shows a schematic representation of a calibration value determination.
Figure 4:
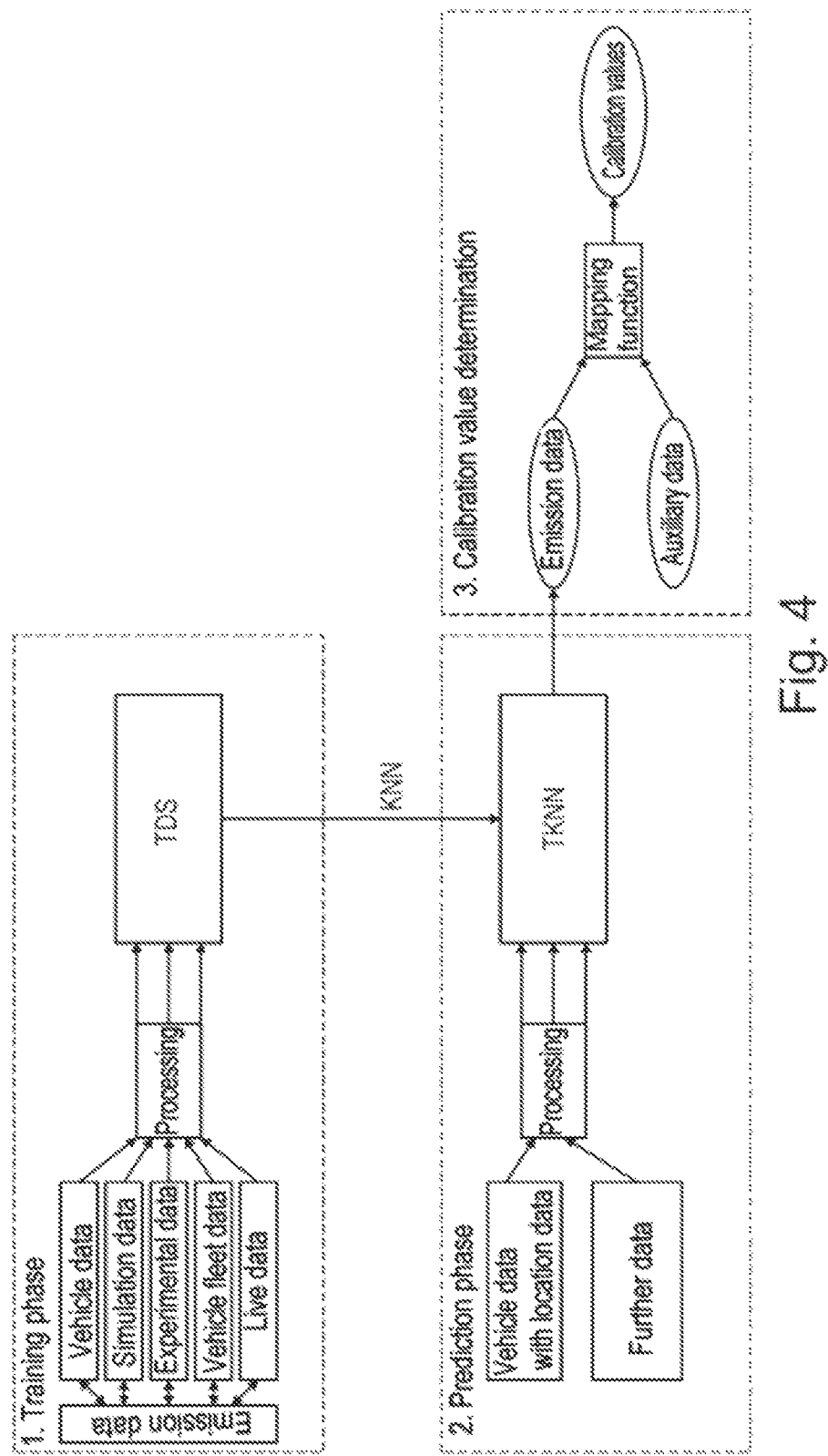
FIG. 4 shows a schematic representation of a method for operating the neural network.
Figure 5:
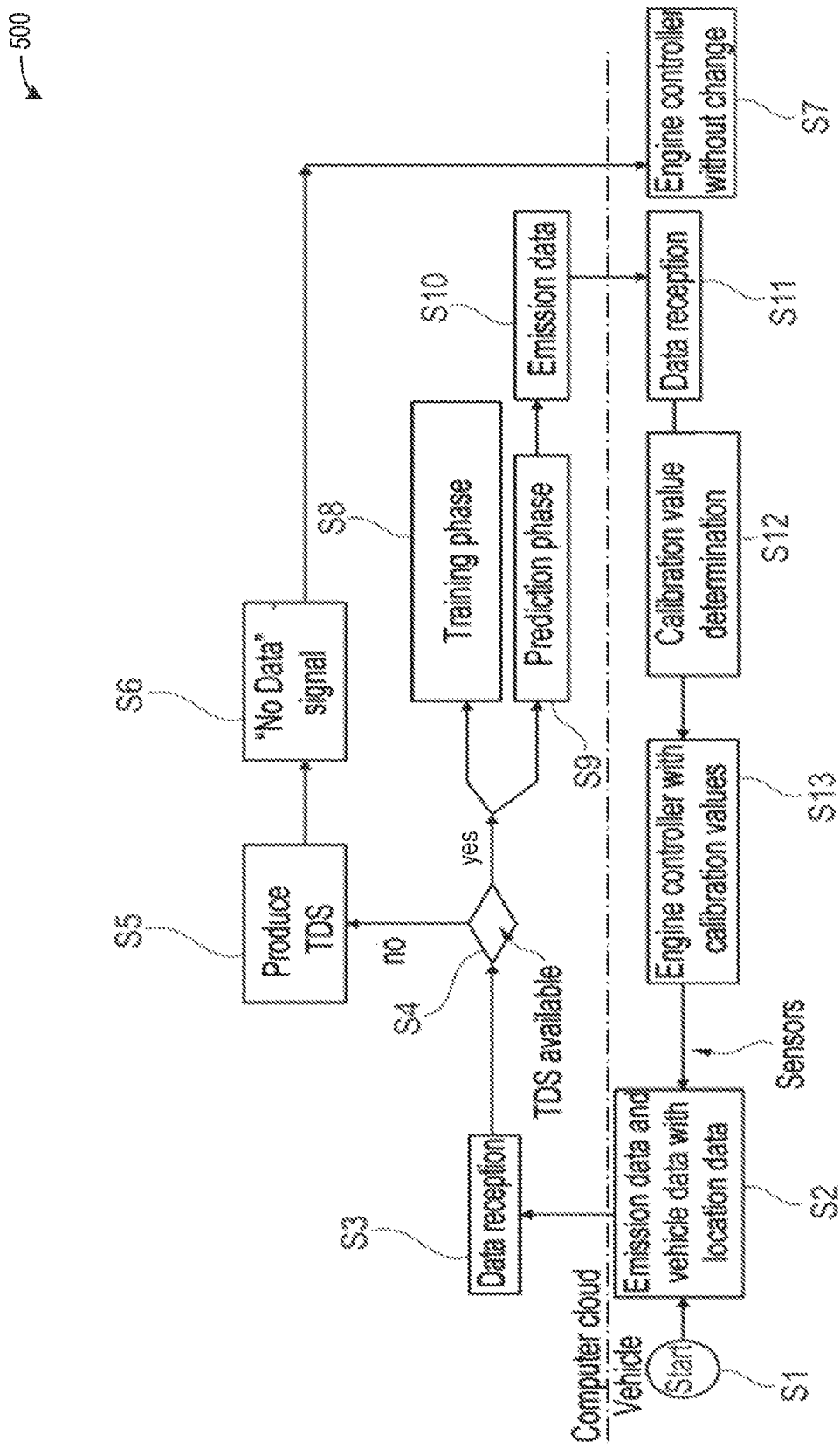
FIG. 5 shows a flow chart of the method.
Figure 6:
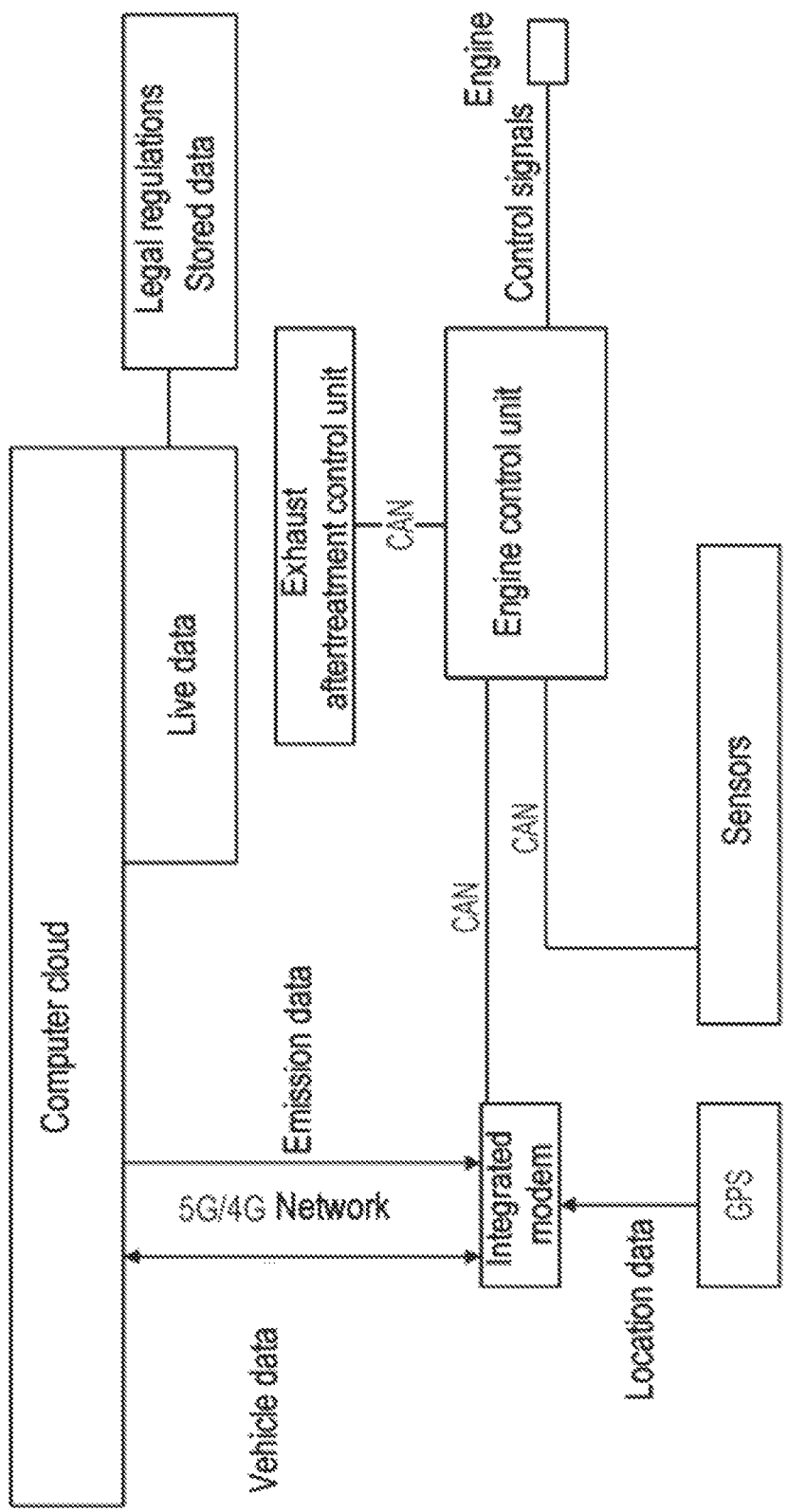
FIG. 6 shows a schematic representation of a server client structure.
Figure 7:
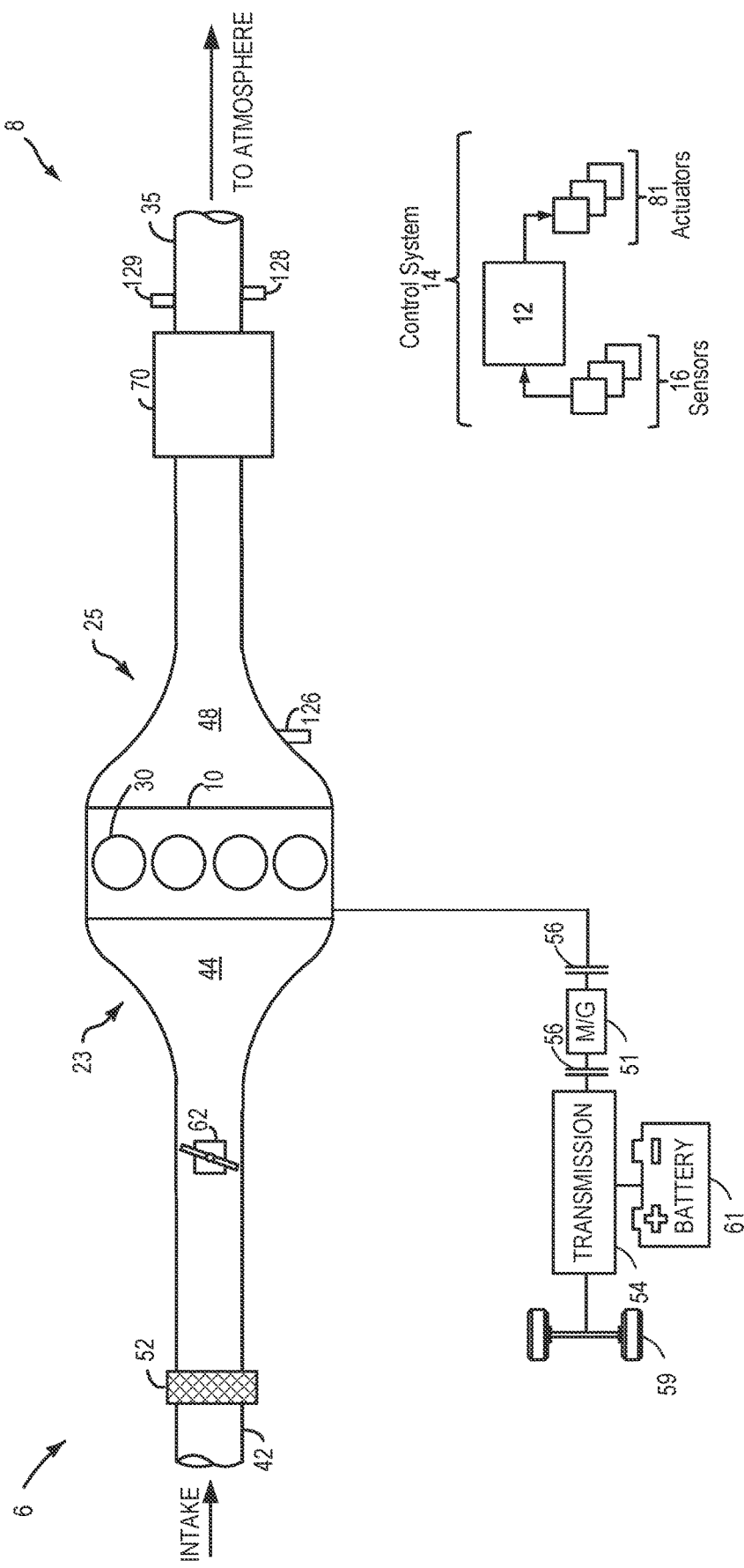
FIG. 7 shows a schematic of a hybrid vehicle including an engine and an electric motor.
Figure 8:
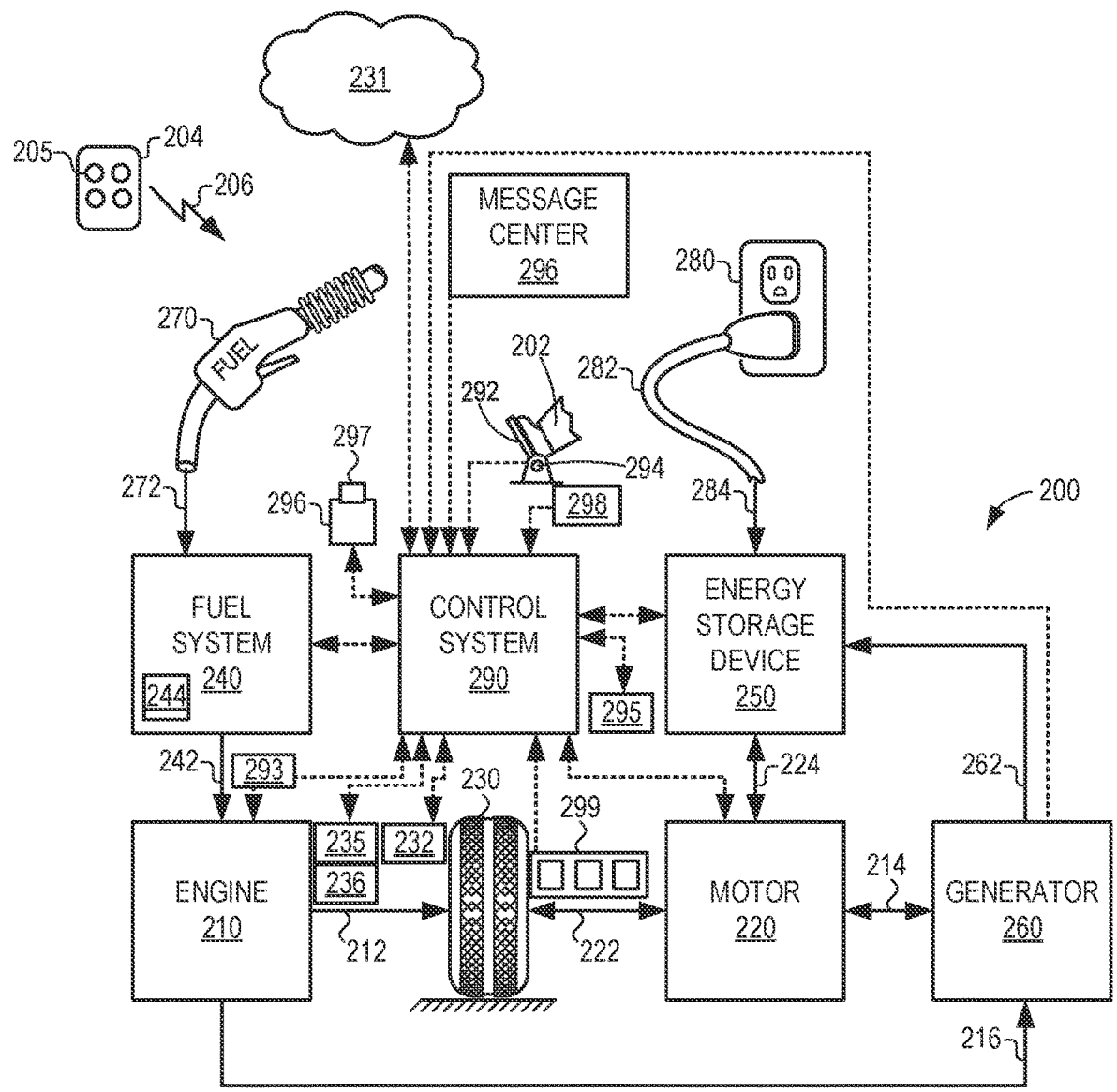
FIG. 8 shows a further schematic of the hybrid vehicle include various hybrid vehicle components.
Figure 9:
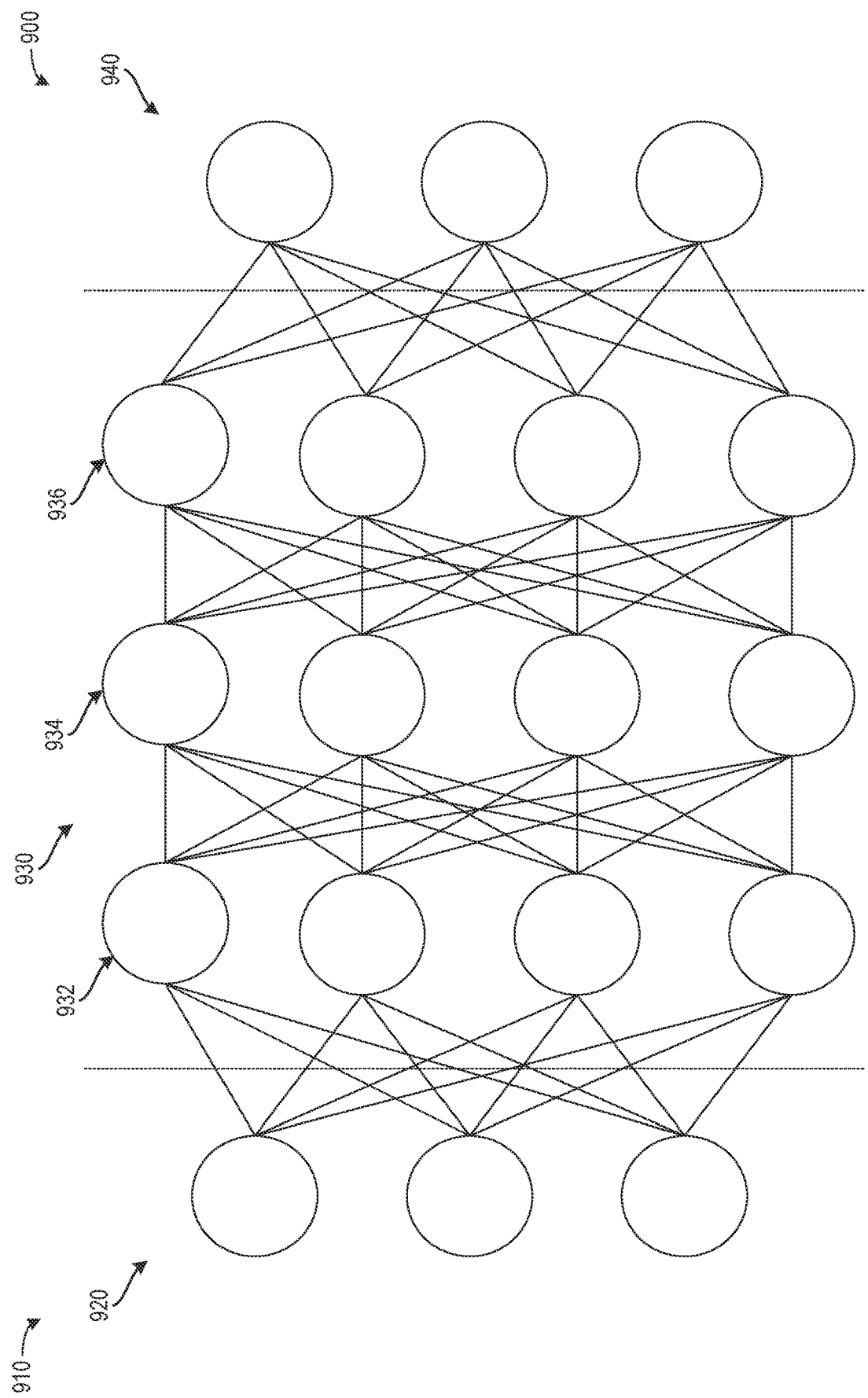
FIG. 9 shows an embodiment of a neural network.
Figure 10:
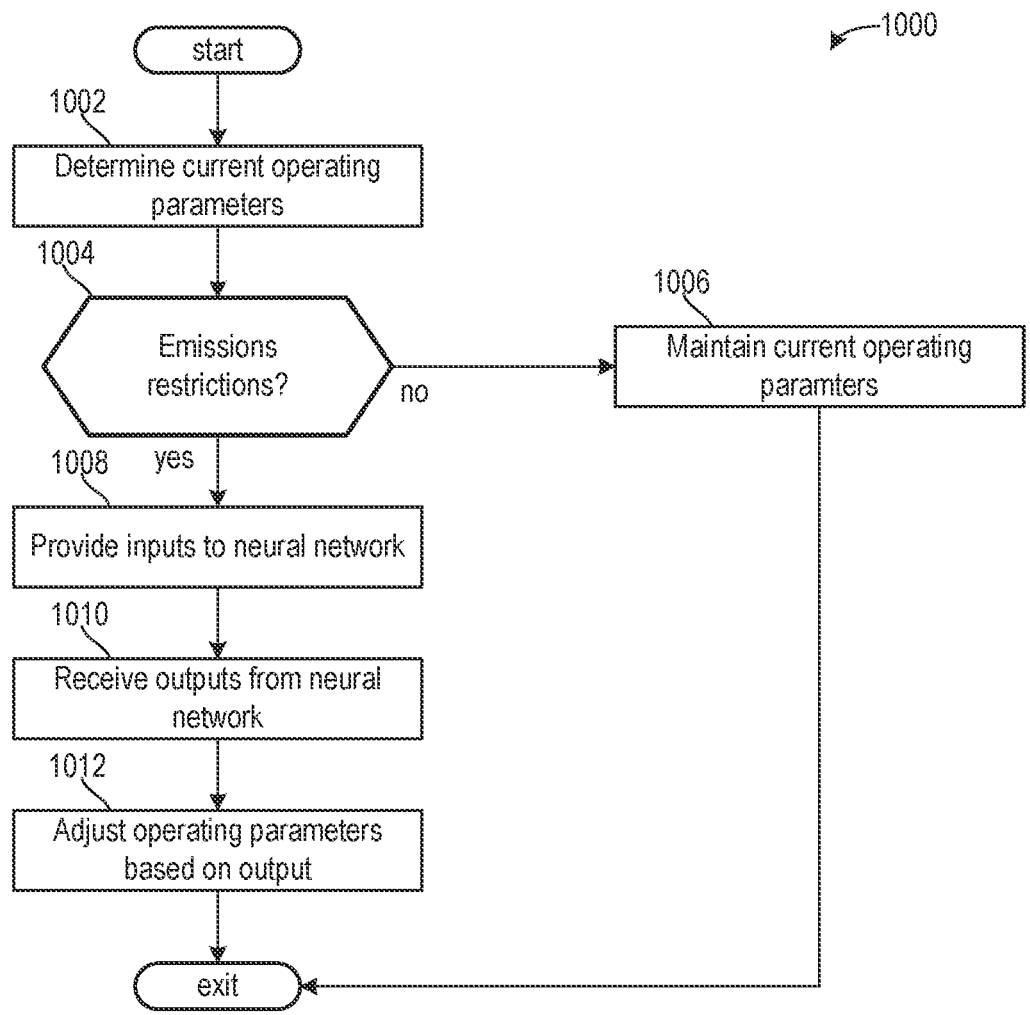
FIG. 10 shows a method for adjusting a powertrain of a vehicle in an emissions zone.
Figure 11:
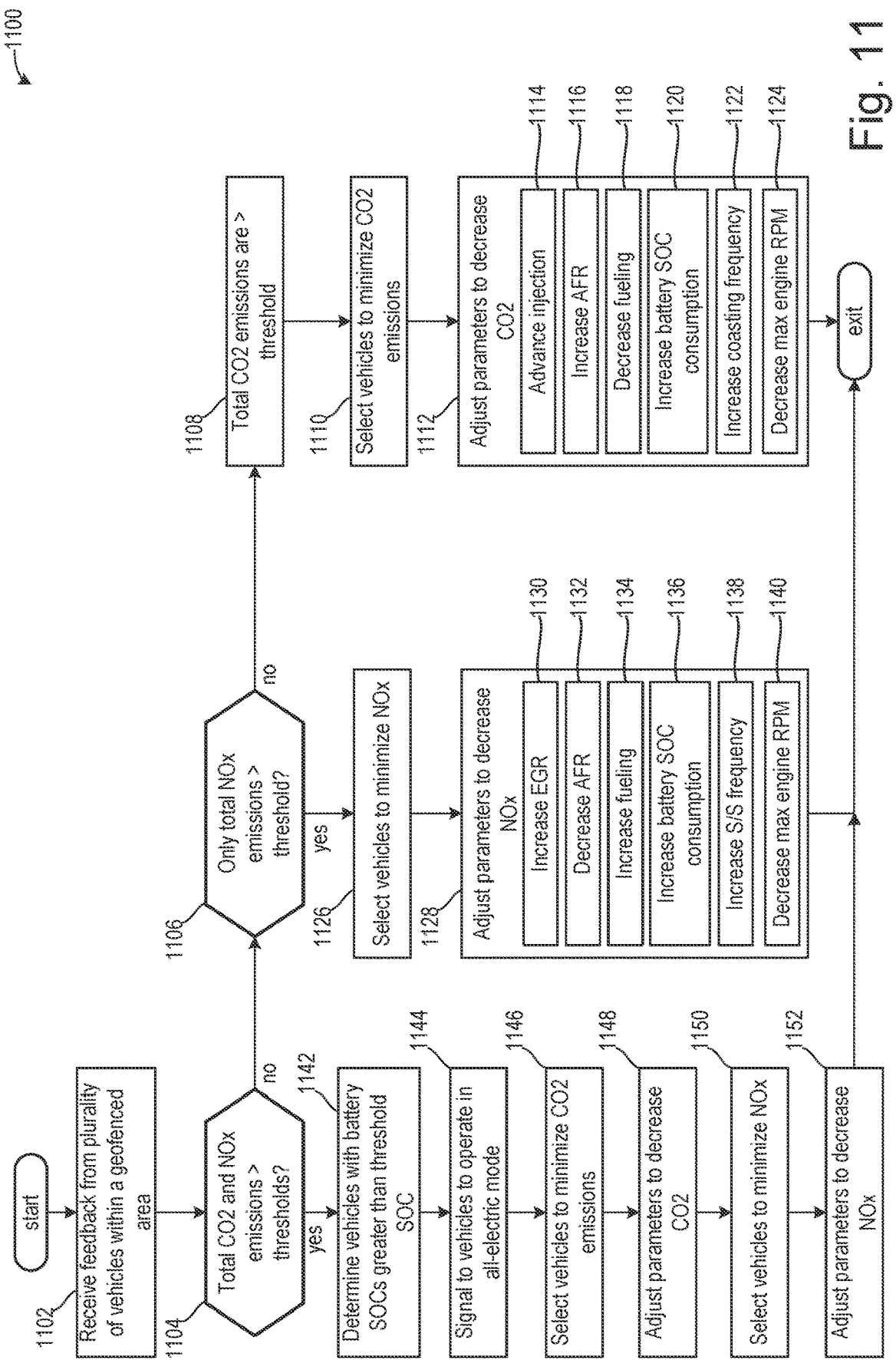
FIG. 11 shows a method for adjusting powertrains of a plurality of vehicle within an emissions zone.

The following description relates to systems and methods for using a neural network to learn from vehicle data and enhance outputs therefrom to enhance vehicle operations without minimal reduction in driver demand. FIG. 1 shows a schematic representation of a training phase. FIG. 2 shows a schematic representation of a prediction phase. FIG. 3 shows a schematic representation of a calibration value determination. FIG. 4 shows a schematic representation of a method for operating the neural network. FIG. 5 shows a flow chart of the method. FIG. 6 shows a schematic representation of a server client structure. FIG. 7 shows a schematic of a hybrid vehicle including an engine and an electric motor. FIG. 8 shows a further schematic of the hybrid vehicle include various hybrid vehicle components. FIG. 9 shows an embodiment of a neural network. FIG. 10 shows a method for adjusting a powertrain of a vehicle in an emissions zone. FIG. 11 shows a method for adjusting powertrains of a plurality of vehicle within an emissions zone.

A first embodiment of the disclosure is related to a computer-implemented method for creating a trained artificial neural network, with which emission data of a vehicle may be predicted based on conditions. The method involves creating multiple training data sets, wherein each training data set includes at least one vehicle datum and an emission datum associated with that vehicle datum, and training an artificial neural network using the training data sets.

A neural network may provide a framework for various algorithms for machine learning, collaboration, and processing of complex data inputs. Such neural networks learn to perform tasks using examples without typically being programmed with task-specific rules.

A neural network is based on a collection of connected units or nodes which are known as artificial neurons. Each connection can transmit a signal from one artificial neuron to another. An artificial neuron that receives a signal can process it and then activate other associated artificial neurons.

In some example implementations of neural networks, the signal at a connection of artificial neurons is a real number, and the output of an artificial neuron is calculated as a nonlinear function of the sum of its inputs. The connections of artificial neurons typically have a weighting that adapts with progressive learning. The weighting increases or decreases the strength of the signal on a connection. Artificial neurons can have a threshold, so that a signal is only emitted when the total signal exceeds that threshold.

A number of artificial neurons are grouped into layers. Different layers may perform different types of transformations for their inputs. Signals migrate from the first layer, e.g., an input layer, to a last layer, e.g., the output layer, possibly after passing through hidden layers several times.

The architecture of an artificial neural network can correspond to a multi-layer perceptron network. A multi-layer perceptron network may belong to the family of artificial feed-forward neural networks. In one example, multi-layer perceptron networks comprise of at least three layers of neurons: an input layer, an intermediate layer, also known as a concealed layer or a hidden layer, and an output layer. This means that all neurons of the network are divided into layers, wherein a neuron of a layer is connected to all neurons of the next layer. There are no connections to the previous layer and no connections that skip a layer. Except for the input layer, the different layers comprise of neurons that are subject to a nonlinear activation function and are connected to the neurons of the next layer. A deep neural network can have many such intermediate layers.

Training an artificial neural network may include adjusting the weightings of neurons and, if desired, threshold values. In one example, three different forms of learning may be used including supervised learning, unsupervised learning, and reinforcement learning.

In supervised learning, the neural network may be presented with a large number of training patterns or training data sets that pass through the neural network. The desired result is known for each training data set, so that a deviation between the actual result and the desired result can be determined. This deviation can be expressed as an error function, the minimization of which is the goal of the training. After completing the training, the trained network is able to show the desired response even to unknown data sets. Consequently, the trained neural network is able to provide or generalize a transfer performance.

In unsupervised learning, on the other hand, no specific desired result is known. Rather, the neural network independently tries to recognize similarities in the data sets and to create categories based on them and to assign further data sets accordingly.

As with unsupervised learning, no specific desired result is known for reinforcement learning. However, there is at least one assessment function to assess whether and, if so, to what extent a result obtained was within a desired tolerance. The neural network may strive to maximize this function.

The method presented here provides that training data sets containing at least one vehicle datum and an emission datum associated with this vehicle datum will be used to train an artificial neural network.

A vehicle datum is a vehicle-related datum, i.e. a datum received by a single vehicle, such as by a sensor of the vehicle or the vehicle's control unit (ECU). For example, a vehicle datum may include engine power, engine torque, engine speed, engine temperature, exhaust gas pressure, fuel pressure, induction pipe pressure, vehicle speed, combustion air ratio k, camshaft angle for inlet and outlet, GPS coordinates of the vehicle, for example longitude and latitude, the traffic situation in the vicinity of the vehicle, travel conditions, for example motorway, country road, etc.

An emission datum may be defined as a datum related to the emission of air pollutants, for example nitrogen oxides emission and/or carbon dioxide emission. An emission datum can be calculated, for example, by means of an appropriate sensor, for example a lambda sensor or a nitrogen oxide sensor, or calculated on the basis of other data, for example fuel consumption in relation to the carbon dioxide emission.

Computer-implemented may defined as at least one step of the method, or several or all steps of the method, are performed using a computer program.

In addition to the vehicle datum and the emission datum, the training data set can include additional data, for example data selected from vehicle fleet data, simulation data, experimental data, and live data. Using these additional data can lead to an enhancement of the trained neural network and consequently to an enhancement in prediction accuracy.

A vehicle fleet datum is vehicle and emission data obtained on the basis of more than one vehicle. In other words, vehicle fleet data represents a collection of multiple vehicle data and associated emission data.

A simulation datum can be a datum that is obtainable by computer simulation. For example, a driving cycle of the vehicle and its powertrain components can be simulated. The simulations can be used to obtain virtual vehicle data and emission data. Simulation data have the advantage of being available cost-effectively compared to actual measurement data. The simulation may involve data from a single vehicle or a fleet of vehicles.

Live data are real-time data obtained from various sensors inside or outside the vehicle. These can be, for example, emission data for certain urban areas, which can be obtained via portable emission measurement systems, for example.

Experimental data are data obtained during measurements at test benches, for example dyno tests, in test areas or in real driving tests, for example emission tests under real driving conditions.

The data of the mentioned data sources may be combined into training data sets. As a result of this method, a trained artificial neural network is obtained, with which emission data of a vehicle can subsequently be predicted. With the appropriately trained artificial neural network, a tool is thus created to be able to predict emission data of a vehicle quickly and reliably, wherein the predicted emission data can serve as input variables for further processes, for example for determining calibration values for a vehicle engine and its corresponding control.

According to various embodiment versions, a forward-facing propagation and a back propagation with a loss function, for example a Huber loss function, can be performed during the training.

Forward-facing propagation refers to a training method in which the output values from the input layer over the respective subsequent layer to the output layer are successively calculated and stored using the weightings and thresholds.

Back propagation is a training method may be used during supervised learning. Here, the gradients of an error function may be determined with respect to all weightings and the weightings of the neural network are iteratively adjusted to minimize the error function. For the gradient calculation, the chain rule of differential calculation is applied recursively from the neurons of the output layer to the neurons of the input layer, i.e. propagated back.

Forward-facing propagation and back propagation work together by performing a back propagation with the output values of the output layer after a forward-facing propagation and by using the adjusted weightings determined by the back propagation for the next forward-facing propagation. Forward-facing propagation and back propagation are repeated until the output error is less than a predeterminable value.

Forward-facing propagation and back propagation are therefore particularly suitable training methods with which a reliably trained neural network can be obtained, which is characterized by a high prediction accuracy of the emission data predicted with the trained network.

Another aspect of the disclosure concerns a computer-implemented method for predicting emission data of a vehicle based on vehicle data, wherein the vehicle data include location data, via a trained artificial neural network which is a result of training an artificial neural network via a method according to any one of the above claims.

In other words, an artificial neural network trained by the method according to the first aspect of the disclosure is used to predict emission data of a vehicle. For this purpose, vehicle data according to the above definition are entered as input data into the trained artificial neural network and processed by it, wherein the vehicle data include location data of the vehicle, for example in the form of GPS coordinates. Emission data are output as output data, which in turn can be further processed.

In some examples, the vehicle data and location data can be processed in real time, so that corresponding emission data can be predicted immediately in one example and, if desired, further processed. Thus, control the emission behavior of vehicles may be executed relatively accurately, since it is possible to react to changing conditions quickly.

Via the trained artificial neural network, emission data, and calibration values that can be determined according to the following description can be determined quickly and cost-effectively. Since the trained artificial neural network is also able to find directly optimized emission data or calibration values for a use case, additional tests and test bench tests to determine the optimal calibration values for this use case can be omitted. This can have a particularly positive effect in the case of a frequent change of limit values associated with emission zones.

For the assessment of emission zones, e.g., areas with traffic restrictions to reduce air pollution, not only location data, but also environmental conditions, such as ambient temperature, traffic situation, road condition, etc. can be taken into account. The emission data and calibration values determinable on the basis thereof can therefore be determined taking into account emission regulations for a variety of different conditions, for example high summer, winter conditions, motorway driving, urban driving, etc. In other words, a very high number of influence parameters, for example GPS coordinates, temperatures, road conditions, etc., can be taken into account, which would not be manageable with previous rule-based algorithms or could only be handled with high costs in terms of time and finances. In contrast, the trained neural network presents itself as a reliable and cost-effective tool for the determination of emission data.

In additional examples, the training of the artificial neural network according to the first embodiment of the disclosure and the prediction of emission data of the vehicle according to the second embodiment of the disclosure can be carried out in conjunction. For example, vehicle data and predicted emission data can be used to create training data sets and to train the artificial neural network. This allows for fast and extensive training of the artificial neural network, so that more reliable predictions can be determined due to the more widespread data base.

According to various embodiment versions of the methods described above, the artificial neural network may be a deep neural network or a recurrent neural network.

A deep neural network may be include a neural network that has at least one intermediate layer in addition to an input layer and an output layer.

Deep neural networks may be characterized by a low cost of computing power compared to recurrent neural networks and work faster on most computer platforms. They also demand less memory space than recurrent neural networks.

A recurrent or feedback neural network may include a neural network characterized by connections of neurons of a layer to neurons of the same or a preceding layer. Examples of such a recurrent neural network are the Elman network, the Jordan network, the Hopfield network, as well as the fully interconnected neural network and the LSTMs (long short-term memory).

A recurrent neural network may be used for processing sequential data. For example, time-dependent data can be processed efficiently since recurrent neural networks are characterized by higher prediction accuracy compared to deep neural networks.

According to further embodiments of the methods explained above, the data, e.g., for example vehicle data, emission data, vehicle fleet data, simulation data, experimental data and/or live data can be processed via filtering, normalizing and/or scaling.

If the data processing is carried out during the training phase, for example before the training data sets are created, the artificial neural network can be trained with greater accuracy, so that more reliable predictions can be determined when using the trained artificial neural network. Processing of the data in the prediction phase, i.e. when using the trained artificial neural network, also enables a more reliable prediction.

Another aspect of the disclosure concerns a computer-implemented method in which calibration values of a vehicle engine are determined based on emission data predicted via a method for predicting emission data according to the above description.

The calibration values obtained can be used to control the vehicle engine in order to influence the emission values and, for example, to comply with limit values with regard to air pollutant emission and/or air pollution of the ambient air.

With the obtained calibration values, the vehicle engine can be operated adapted to the air pollutant situation, wherein the air pollutant situation can be characterized, for example, by air pollutants already present in the vehicle environment, air pollutants emitted by the vehicle, legal location-dependent limit values with regard to air pollutants, etc. For example, the nitrogen oxide emissions of the vehicle outside zones with traffic restrictions can be adjusted to reduce air pollution in such a way that the exhaust gas recirculation, which has a negative effect on the engine braking torque, can be reduced. This, in turn, can lead to a reduction in fuel consumption.

For example, it may be provided that the predicted emission data are compared with emission limits, for example legally prescribed limit values, and that if the emission limit values are exceeded, the calibration values can be determined in such a way that the emission limits are no longer exceeded when operating the vehicle engine with the determined calibration values.

In one example, the determination of the calibration values is carried out in such a way that the operation of the vehicle engine with the changed calibration values does not influence the driving of the vehicle, for example its speed, torque, acceleration, etc., or at most slightly, wherein at the same time predetermined emission limits are complied with.

The calibration values can be obtained, for example, by finding them by means of a lookup table based on the emission data. In addition to the emission data, further data, for example auxiliary data can be used such as the position of the exhaust gas recirculation valve, the position of the turbocharger, the throttle position, the fuel pressure, the fuel injection time and/or fuel injection duration. The auxiliary data can be determined by means of appropriate sensors. The auxiliary data can be any data that are not included in the vehicle data and emission data and which are used to determine the calibration values via a so-called mapping function, for example predefined calibration values.

The look-up table can be present in the vehicle itself, for example in the engine control unit (ECU), to which the emission data are transmitted from outside, for example a cloud server. Consequently, the engine control unit is designed to receive and process the emission data.

Alternatively, the lookup table may be arranged outside the vehicle, so that only the calibration values are transmitted to the vehicle. As such, the lookup table may be stored in a computer cloud, a network, or other database.

According to different embodiments, the vehicle engine can be automatically controlled by using the determined calibration values if the vehicle is within a specified geographical region.

For example, the defined region may be a zone with traffic restrictions to reduce air pollution. Thus, if such a region is used with the vehicle, which can be detected via a global satellite navigation system of the vehicle, for example, it may be provided that the vehicle is automatically controlled via the determined calibration values, e.g., without the demand for intervention or confirmation by the driver.

This may enhance compliance with limits regarding air pollutant emission and/or air pollution of the ambient air.

According to further embodiments, it may be provided that the vehicle issues a notification if it is outside a specified geographical region.

The specified geographical region may be, for example, the region in which the vehicle engine is automatically controlled via the determined calibration values if the vehicle is within this region, even or a different geographical region.

For example, an acoustic, optical and/or haptic notification can be issued to the driver of the vehicle. This allows the driver to decide independently whether or not the engine may be controlled via the determined calibration values. Since the calibration values determined can be accompanied by a reduction in speed, for example, it is therefore up to the driver to decide whether he gives priority to low emissions or reaching his driving destination quickly. In addition, the option of his own decision can contribute to increasing the acceptance of the whole method by the driver, since he is granted a certain margin of discretion, at least outside of defined geographical regions.

Another aspect of the disclosure is related to a system for data processing which includes a processor for the execution of one of the methods described above. Therefore, the advantages of the method according to the disclosure are also achieved with the system according to the disclosure for data processing. All the explanations with respect to the method according to the disclosure can be transferred analogously to the system according to the disclosure for data processing.

For example, the data processing system can include an input unit, a calculation unit, and an output unit. The input unit can have an input interface for receiving training data sets, among other things. Preferably, the data processing system can be trained as a cloud server, which is or can be connected for data transmission to a client, which is arranged in or on the vehicle.

Another aspect of the disclosure concerns a computer program having commands that cause it to perform one of the methods described above when the program is executed by a computer. Therefore, the advantages of the method according to the disclosure are also achieved with the computer program according to the disclosure. All details regarding the method according to the disclosure can be transferred analogously to the computer program according to the disclosure.

A computer program can be defined as a program code that can be stored on a suitable medium and/or can be retrieved via an appropriate medium. Any medium suitable for storing software, such as a non-volatile memory installed in a control unit, a DVD, a USB stick, a flashcard, or the like, can be used to store the program code. For example, the program code can be accessed over the Internet or an intranet, or over another appropriate wireless or wired network.

Another aspect of the disclosure concerns a computer-readable data carrier on which the computer program is stored.

In FIG. 1, the training phase of the artificial neural network KNN is shown schematically, via which a trained artificial neural network TKNN is obtained, with which emission data of a vehicle can be predicted based on vehicle data.

First, data from various sources, namely vehicle data, simulation data, experimental data, vehicle fleet data, and live data and the respective related emission data are collected and processed, wherein the data processing may include filtering, normalization, and/or scaling.

From the processed data, training data sets TDS are created, with which an artificial neural network KNN is trained. Each training data set TDS includes a combination of the data from different sources and the respective associated emission data.

Forward-facing propagation and back propagation with a loss function can be used as training methods. As a result, a trained artificial neural network TKNN will be obtained.

Based on vehicle data containing vehicle location data and, if desired, other data, the trained artificial neural network TKNN may predict the emission data associated with these data and the air pollution of a particular geographic area. Due to the broad data base for the training phase, the trained artificial neural network may be characterized by a high prediction accuracy. The trained artificial neural network TKNN is therefore a reliable tool for estimate the emissions of the vehicle and the air pollution.

In one example, the training includes comparing outputs from the TKNN that are executed in a real-world to a variety of corresponding threshold values. Differences between real-world values and the threshold values are used to adjust the filtering, normalization, and/or scaling values so that future outputs may result in real-world values closer to corresponding thresholds. In one example, multiple trained neural networks may exist for various vehicles including all-electric vehicles, hybrid vehicles, and combustion engine vehicles.

In FIG. 2, the application of the trained artificial neural network TKNN (prediction phase) is shown schematically. The trained artificial neural network TKNN may predict emission data of a vehicle based on vehicle data. The vehicle data include at least location data, so that a location-resolved assessment of the emissions is possible.

First, vehicle data including location data as well as further data if desired are collected and processed. Subsequently, the processed data are fed to the trained artificial neural network TKNN and processed by this, for example using forward-facing propagation. The result of this processing is the output of emission data.

The trained artificial neural network can be used in particular online, e.g., in real time. The received emission data can then be used to determine calibration values for the vehicle engine via a mapping function. In one example, the mapping function includes a look-up table or a multidimensional performance map, so that the vehicle's emission behavior can be adjusted by changing the calibration values. In one example, the look-up table is a multi-input look up table wherein inputs include one or more of manifold pressure, throttle position, engine temperature, engine speed, vehicle speed, torque, weather, and the like.

The training phase and the prediction phase can be performed sequentially or in tandem. In other words, the vehicle data and the emission data can be available to the artificial neural network KNN continuously, so that the predictive quality is also continuously enhanced by continuous training. Both the training phase and the prediction phase can be carried out in a cloud-based manner.

In FIG. 3, the calibration value determination is shown schematically. For this purpose, the emission data predicted by the trained artificial neural network are fed to a mapping function and processed together with auxiliary data, for example temperature, pressure, etc. The mapping function can be understood as a reference table, via which calibration values can be found for the input data, i.e. the predicted emission data and the auxiliary data, wherein minimum nitrogen oxide and/or carbon dioxide emissions can be achieved with the application of this to engine control. As a result of the processing of the input data, calibration values for the calibration of the vehicle engine are obtained.

The calibration value determination may be carried out in the vehicle itself, for example using the engine control unit (e.g., a controller 12 illustrated in FIG. 7). For this purpose, the emission data from a computer cloud can be transferred to the vehicle and available to the engine control unit. Based on the determined calibration values, the parameters of the vehicle, for example the engine parameters, can be adjusted, so that, for example, legal regulations regarding the emission of air pollutants can be complied with. For this purpose, corresponding control signals can be output from the engine control unit to the actuators, for example the injection device, the throttle valve, etc.

The specific calibration values may depend on the specific drive system of the vehicle and other conditions. For example, with a petrol-powered engine a cylinder shutdown can be activated or deactivated. In the case of a hybrid powertrain, on the other hand, switching to an electrical operating state may be possible. Speed restrictions can be applied to all internal combustion engines.

Within zones with restrictions to reduce air pollution, it may be provided that the calibration values may be used automatically to change the vehicle parameters accordingly without the intervention of the driver or vehicle user. For example, the vehicle user can be a fleet manager who sets the appropriate specifications for some or all vehicles in a vehicle fleet. In this way, the calibration values may be adjusted while inputs from a vehicle operator are unchanged relative to prior to the adjustment.

Outside such zones, on the other hand, it may be provided that the conversion of the calibration values in the form of a change in the vehicle parameters is only carried out upon request from the driver or vehicle user.

It may be provided, in some examples, where the driver or vehicle user has the option to activate or deactivate an automatic application of the calibration values. For example, a corresponding driving mode can be selected. In addition to existing driving modes, such as sports mode or fuel-saving mode, a so-called green mode or fuel-saving mode can be set, the aim of which is the lowest possible emission of air pollutants, for example nitrogen oxides and/or carbon dioxide. The selection of the specific air pollutants can be executed depending on the geographical position. For example, the goal in cities may be to achieve a lowest possible nitrogen oxide emissions, while outside cities the lowest possible carbon dioxide emissions may be targeted.

In FIG. 4, an overall method with a training phase, a prediction phase, and calibration value determination is shown schematically. The training phase is used to train the artificial neural network KNN with training data sets TDS, which are obtained from processed vehicle data, simulation data, experimental data, vehicle fleet data, live data, and associated emission data.

In the prediction phase, emission data are then predicted using the trained artificial neural network TKNN. For this purpose, processed vehicle data with location data and other data are processed by the trained artificial neural network.

In the calibration value determination phase, the predicted emission data and auxiliary data are fed to the mapping function and calibration values are determined by means of these. These determined calibration values can then be used for engine control, as described above with respect to FIGS. 1 to 3.

FIG. 5 shows a flow diagram of a method 500. Here, the steps of the method S3 to S6 and S8 to S10 are carried out in a computer cloud, while the steps S1, S2, S7 and S11 to S13 are carried out in the vehicle, which can be designed as a passenger car for example. The separation between the computer cloud and the vehicle is represented in FIG. 5 by a dashed-dotted line. Data transmission between the computer cloud and the vehicle can be carried out on a radio basis, for example using a 4G or 5G communication network. Data can be received in the vehicle via a modem integrated in the vehicle.

Instructions for carrying out method 500 and the rest of the methods included herein may be executed by a controller based on instructions stored on a memory of the controller and in conjunction with signals received from sensors of the engine system, such as the sensors described below with reference to FIG. 7. The controller may employ engine actuators of the engine system to adjust engine operation, according to the methods described below. In the example of FIG. 5, the controller may execute a portion of the method 500 occurring within the vehicle, where a processor of the computer cloud may execute a remainder of the method 500. The processor and the controller may each include memory with instructions stored thereon that when executed enable the processor and controller to execute the steps of method 500.

In step S1, the vehicle's engine is started, and vehicle data may be continuously recorded (step S2) with location data as well as emission data. These vehicle data and emission data are transmitted to the computer cloud and received by it in step S3. In step S4 a check is carried out of whether training data sets TDS are available for the vehicle data and the emission data.

If this is not the case, the method proceeds to step S5 and training data sets are created from the vehicle data and the emission data. In the subsequent step S6, a "No Data" signal is transmitted to the vehicle. The "No Data" signal may be defined as there is no adequately trained artificial neural network TKNN and therefore this cannot be used to predict emission data. In step S7, therefore, the engine control is carried out with a standard calibration, i.e. without modification. The standard calibration can also be used if the data transfer between the computer cloud and the vehicle is interrupted.

If, on the other hand, step S4 determines that training data sets TDS are present, steps S8 and S9 are performed in parallel. In step S8, a (further) training of the artificial neural network KNN takes place using the data transmitted to the computer cloud in step S3. For details of the training procedure, refer to the explanations for FIG. 1.

In step S9, the prediction of emission data is carried out on the basis of the data transmitted to the computer cloud in step S3, so that in step S10 predicted emission data are obtained, which are transmitted to the vehicle and received by it in step S11. For details of the prediction procedure, refer to the explanations for FIG. 2.

The predicted emission data received by the vehicle in step S11 are used in step S12 for calibration value determination by the engine control unit using the mapping function. For details of the calibration value determination, refer to the explanations for FIG. 3. In step S13, the determined calibration values are used for the corresponding control of the vehicle engine. The resulting vehicle data and emission data can be determined by sensors and fed to the procedure again (step S2).

In FIG. 6, the server-client structure is shown schematically, as it can be used to carry out the method described in relation to FIG. 5. The server is a computer cloud that can be provided in the form of Ford's so-called Ford Data and Telematics Service, for example. The computer cloud receives live data as well as legal regulations and stored data and is connected to a modem which is integrated into the vehicle as a client, wherein the data transfer takes place via a 4G or 5G network. Vehicle data and emission data are exchanged between the computer cloud and the integrated modem.

The integrated modem is connected to the vehicle's engine control unit via a CAN bus system. Furthermore, sensors, for example sensors for determining the engine temperature and pressure sensors, and a control unit for controlling the exhaust aftertreatment are connected to the engine control unit via a CAN bus system. Depending on the design of the engine or powertrain, the control unit for controlling the exhaust aftertreatment may also be omitted, for example in the case of a design of the powertrain as a hybrid powertrain or a design of the engine as a petrol engine. The engine control unit issues control signals to the engine to control it according to the calibration values.

FIG. 7 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

FIG. 8 illustrates an example vehicle propulsion system 200 which may be used similarly to hybrid vehicle system 6 of FIG. 7. Vehicle propulsion system 200 includes a fuel burning engine 210 and a motor 220. As a non-limiting example, engine 210 comprises an internal combustion engine and motor 220 comprises an electric motor. Engine 210 may be used substantially similarly to engine 10 of FIG. 1 and motor 220 may be used similarly to electric machine 51 of FIG. 1. Motor 220 may be configured to utilize or consume a different energy source than engine 210. For example, engine 210 may consume a liquid fuel (e.g., gasoline) to produce an engine output while motor 220 may consume electrical energy to produce a motor output. As such, a vehicle with propulsion system 200 may be referred to as a hybrid electric vehicle (HEV).

Vehicle propulsion system 200 may utilize a variety of different operational modes depending on operating conditions encountered by the vehicle propulsion system. Some of these modes may enable engine 210 to be maintained in an off state (i.e., set to a deactivated state) where combustion of fuel at the engine is discontinued. For example, under select operating conditions, motor 220 may propel the vehicle via drive wheel 230 as indicated by arrow 222 while engine 210 is deactivated, which may herein be referred to as an electric-only operation.

In another example, the engine may be equipped with a start/stop (S/S) feature 293, wherein the engine 210 may be automatically shut down during times when the vehicle is not moving, or when the vehicle speed is below a threshold speed, when engine speed is below a threshold engine speed, etc. Control system 290 may be connected to engine 210 and S/S feature 293, for performing the start-stop functions. Advantages to the S/S functionality may include an enhancement in fuel economy over other vehicles that do not employ such technology. During the start/stop the vehicle may be propelled via its momentum and not by the engine 210 or the motor 220.

Herein, "automatically" executing various vehicle features, such as S/S, refers to execution of the various features without vehicle operator input. That is to say, the vehicle operator does not directly signal or request the S/S or other automatic features to be executed. As such, automatic features are automatically executed in a response to current operating conditions and may not be directly signaled by the operator. This usage of automatically is used for other operations as well, such as automatic adjustments to vehicle operating parameters based on output from the neural network without vehicle operator input.

During other operating conditions, engine 210 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some examples. However, in other examples, generator 260 may instead receive wheel torque from drive wheel 230, where the generator may convert the kinetic energy of the vehicle to electrical energy for storage at energy storage device 250 as indicated by arrow 262. In some examples, the engine 210 may deactivate during regenerative braking and traction at the drive wheel 230 may be negative, such that the motor 220 may spin in reverse and recharge the energy storage device 250. Thus, regenerative braking may be distinguished from an electric-only operation, where the motor 220 may provide positive traction at the drive wheel 230, thereby decreasing a SOC of the energy storage device 250 while the engine 210 is deactivated.

During still other operating conditions, engine 210 may be operated by combusting fuel received from fuel system 240 as indicated by arrow 242. For example, engine 210 may be operated to propel the vehicle via drive wheel 230 as indicated by arrow 212 while motor 220 is deactivated, such as during a charge-sustaining operation. During other operating conditions, both engine 210 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system or a hybrid propulsion. Note that in some examples, motor 220 may propel the vehicle via a first set of drive wheels and engine 210 may propel the vehicle via a second set of drive wheels.

In other examples, vehicle propulsion system 200 may be configured as a series type vehicle propulsion system, whereby the engine does not directly propel the drive wheels. Rather, engine 210 may be operated by power motor 220, which may in turn propel the vehicle via drive wheel 230 as indicated by arrow 222. For example, during select operating conditions, engine 210 may drive generator 260 as indicated by arrow 216, which may in turn supply electrical energy to one or more of motor 220 as indicated by arrow 214 or energy storage device 250 as indicated by arrow 262. As another example, engine 210 may be operated to drive motor 220 which may in turn provide a generator function to convert the engine output to electrical energy, where the electrical energy may be stored at energy storage device 250 for later use by the motor.

Fuel system 240 may include one or more fuel storage tanks 244 for storing fuel on-board the vehicle. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 210 as indicated by arrow 242. Still other suitable fuels or fuel blends may be supplied to engine 210, where they may be combusted at the engine to produce an engine output. The engine output may be utilized to propel the vehicle as indicated by arrow 212 or to recharge energy storage device 250 via motor 220 or generator 260.

In some examples, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 250 may include one or more batteries and/or capacitors. In some examples, increasing the electrical energy supplied from the energy storage device 250 may decrease an electric-only operation range, as will be described in greater detail below.

Control system 290 may communicate with one or more of engine 210, motor 220, fuel system 240, energy storage device 250, and generator 260. In some examples, control system 290 may be used similarly to controller 12 of FIG. 7. Control system 290 may receive sensory feedback information from one or more of engine 210, motor 220, fuel system 240, energy storage device 250, and generator 260. Further, control system 290 may send control signals to one or more of engine 210, motor 220, fuel system 240, energy storage device 250, and generator 260 responsive to this sensory feedback. In some examples, control system 290 may receive an indication of an operator requested output of the vehicle propulsion system from a vehicle operator 202. For example, control system 290 may receive sensory feedback from pedal position sensor 294 which communicates with pedal 292. Pedal 292 may refer schematically to a brake pedal and/or an accelerator pedal. Furthermore, in some examples control system 290 may be in communication with a remote engine start receiver 295 (or transceiver) that receives wireless signals 206 from a key fob 204 having a remote start button 205. In other examples (not shown), a remote engine start may be initiated via a cellular telephone, or smartphone based system where a user's cellular telephone sends data to a server and the server communicates with the vehicle to start the engine.

In some examples, additionally or alternatively, the vehicle propulsion system 200 may be configured to operate autonomously (e.g., without a human vehicle operator). As such, the control system 290 may determine one or more desired operating engine conditions based on estimated current driving conditions.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnect between power source 280 and energy storage device 250. Control system 290 may identify and/or control the amount of electrical energy stored at the energy storage device, which may be referred to as the state of charge (SOC).

In other examples, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 210.

Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some examples, fuel tank 244 may be configured to store the fuel received from fuel dispensing device 270 until it is supplied to engine 210 for combustion. In some examples, control system 290 may receive an indication of the level of fuel stored at fuel tank 244 via a fuel level sensor. The level of fuel stored at fuel tank 244 (e.g., as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and a roll stability control sensor, such as a lateral and/or longitudinal and/or yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling. For example, as described in more detail below, in response to the vehicle operator actuating refueling button 297, a fuel tank in the vehicle may be depressurized so that refueling may be performed.

Control system 290 may be communicatively coupled to other vehicles or infrastructures using appropriate communications technology, as is known in the art. For example, control system 290 may be coupled to other vehicles or infrastructures via a wireless network 231, which may comprise Wi-Fi, Bluetooth, a type of cellular service, a wireless data transfer protocol, and so on. Control system 290 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 290 may be communicatively coupled to other vehicles or infrastructures via a wireless network 231 and the internet (e.g. cloud), as is commonly known in the art. One example of a V2V communication device may include dedicated-short-range-communication (DSRC) network which may allow vehicles within a threshold proximity (e.g., 5,000 feet) to communicate (e.g., transfer information) free of an internet connection.

Vehicle system 200 may also include an on-board navigation system 232 (for example, a Global Positioning System) that an operator of the vehicle may interact with. The navigation system 232 may include one or more location sensors for assisting in estimating vehicle speed, vehicle altitude, vehicle position/location, etc. This information may be used to infer engine operating parameters, such as local barometric pressure. As discussed above, control system 290 may further be configured to receive information via the internet or other communication networks. Information received from the GPS may be cross-referenced to information available via the internet to determine local weather conditions, local vehicle regulations, etc.

In some examples, vehicle propulsion system 200 may include one or more onboard cameras 235. Onboard cameras 235 may communicate photos and/or video images to control system 290, for example. Onboard cameras may in some examples be utilized to record images within a predetermined radius of the vehicle, for example. The onboard cameras 235 may be arranged on an exterior surface of the vehicle so that an area surrounding and/or adjacent to the vehicle may be visualized.

FIGS. 7-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 9, it shows an embodiment 900 of an example neural network 910 include an input layer 920, hidden layers 930, and an output layer 940. In one example, the input layer 920 may include n number of input nodes, each node of the input layer may be in communication with a node of an adjacent hidden layer of the hidden layers 930. The hidden layers 930 may include a first hidden layer 932, a second hidden layer 934, and a third hidden layer 936. The first hidden layer 932 may be in communication with the input layer 920. Thus, each node of the input layer may provide feedback to each node of the first hidden layer 932. The first hidden layer 932 may execute a first plurality of weights to the inputs received and provide outputs to the second hidden layer 934, wherein the second hidden layer 934 may execute a second plurality of weights. The second hidden layer 934 may provide an output to the third hidden layer 936. That is to say, each node of the second hidden layer 934 may communicate with each node of the third hidden layer 936. The third hidden layer 936 may execute a third plurality of weights and output values to the output layer 940. Each node of the third hidden layer 936 may communicate with each node of the output layer 940. Values from the output layer 940 may be used directly for adjusting one or more operating parameters of the vehicle in response to one or more of the inputs provided to the input layer 920. A method for adjusting vehicle operating parameters based on inputs provided to the neural network 910 and outputs received from the neural network 910 is shown in FIG. 10.

Turning now to FIG. 10, it shows a method 1000 for adjusting operating parameters in response to an output provided by the neural network. The output of the neural network being based on inputs provided to the neural network as described above.

The method 1000 begins at 1002, which includes determining current operating parameters. Current operating parameters may include but are not limited to manifold pressure, throttle position, engine speed, vehicle speed, exhaust-gas recirculate (EGR) flow rate, and air/fuel ratio. Additionally or alternatively, the current operating parameters may further include weather, vehicle location, time of day, driver behavior, traffic conditions and the like.

In one example, vehicle location may be determined based on feedback from a GPS device. The GPS may provide feedback regarding a current vehicle location. In one example, the vehicle location may be associated with a geofenced area. For example, the geofenced area may include a school, a stadium, a park, a city, a country road, a highway, and the like. In some examples, based on a time of day, driving conditions within the geofenced area may differ. For example, driving in the city at 5:00 PM may correspond to different driving conditions than driving through the city at 1:00 PM.

In one example, additionally or alternatively, driver behavior may be determined by a driving mode selected by a vehicle operator, where the vehicle operator may choose from an aggressive or economic mode. The vehicle operator may be determined by the controller receiving data from sensors in the vehicle, and the controller may signal start/stop operating parameters based on the driver behavior of the vehicle operator. In one example, a weight sensor located in a driver seat in a vehicle may measure the weight of the vehicle operator. The weight may be used to identify an identity of the vehicle operator, wherein a driver behavior may be associated with the vehicle operator. In one example, additionally or alternatively, the vehicle operator may be identified via a wired or a wireless connection to a mobile device, such as a mobile phone, from a navigation system, infotainment system, or the controller. In one example, additionally or alternatively, the vehicle operator may drive the vehicle at a specific time of day, allowing the controller to associate times of vehicle use with driver behavior tied to a vehicle operator identity.

The method 1000 may proceed to 1004, which may include determining if emissions restrictions are present. Emissions restrictions may be present based on one or more of the geofenced area and the time of day. Additionally or alternatively, the emission restrictions may be adjusted within the geofenced area throughout a day. For example, emissions restrictions may be increased during rush hour or high traffic times in a city limits compared to low traffic times. As another example, an emissions restriction near a school may be higher during school hours than outside of school hours. As a further example, an emissions restriction may increase during an event at a stadium while being reduced during times where an event is not occurring.

If an emissions restriction is not present, then the method 1000 may proceed to 1006, which may include maintain current operating parameters. In one example, the method may further include not updating vehicle operating parameters based on feedback from the neural network.

If an emissions restriction is present, then the method 1000 may proceed to 1008, which includes providing inputs to the neural network. In one example, the sensors of FIGS. 7 and 8 may provide feedback to the controller, wherein the controller may relay the feedback to a processor of the neural network. In one example, the feedback provided to the controller may be transmitted as inputs to the input layer of the neural network. As described above with respect to FIG. 9, the inputs may be fed to a one or more hidden layers, where weights may be applied thereto. The weights may be adjusted based on previous training routines. That is to say, the outputs from the neural network may be sent to the controller via the processor, wherein the outputs may correspond to operating parameter adjustments. Sensors of the vehicle may sense resulting changes based on the operating parameters adjustments and send the data to the processor via the controller. The data may be analyzed relative to various thresholds, wherein differences between the data and the thresholds may be used to adjust the weights applied during the hidden layer, such that future outputs from the output layer may result in real-world operating conditions closer in value to the various thresholds.

As a non-limiting example, if it is desired to reduce $NO_x$ output within a specific area, then the neural network may provide a plurality of outputs with regard to engine temperature, EGR flow rate, air/fuel ratio, and the like. Following the changes (e.g., reduce engine temperature, increase EGR flow rate, and decrease air/fuel ratio), the sensors of the vehicle may provide feedback to the controller, which relays the feedback to the processor via a communication device described above (e.g., a modem). In one example, the feedback may include $NO_x$ output, engine temperature, EGR flow rate, and air/fuel ratio. The processor may compare the feedback to corresponding inputs and adjust the weights based on differences between the feedback and the corresponding thresholds. For example, the $NO_x$ output may be compared to a threshold $NO_x$ output, which is based on the emissions restriction. If the $NO_x$ output is still above the emissions restriction, then the weights may be adjusted based on a difference therebetween. Additionally or alternatively, the current engine temperature of the vehicle may be compared to the output engine temperature from the neural network. A weight may be adjusted based on a difference between the output from the neural network and the current engine temperature.

The method 1000 may proceed to 1008, which includes providing inputs to the neural network. As described, the inputs may be based on feedback from sensors of the vehicle provided to the controller of the vehicle. A communication element, such as a modem, may be used to relay the feedback to the processor of a wireless database, such as a cloud, which may be fed to an input layer of the neural network.

The method 1000 may proceed to 1010, which include receiving outputs from the neural network. As described above, the outputs may be determined via weights applied to the inputs communicated from the input layer to the hidden layer.

The method 1000 may proceed to 1012, which includes adjusting operating parameters based on the outputs provided by the neural network. For example, adjusting operating parameters may include adjusting an engine temperature, an air/fuel ratio, an EGR flow rate, a vehicle speed, a fuel injection timing, a spark timing, and the like. Additionally or alternatively, the adjusting operating parameters may include switching from an internal combustion engine only operating mode to a hybrid mode or to an all-electric mode.

In one example, a system which receives emissions rates from data services and adjusts its engine performance. The emissions rates such as $CO_2$ and $NO_x$ (received from the data services) may be assigned to a function in the controller which has an emission map assigned as a parameter. This map calibrated controller instructions for signals to actuators configured to adjust $NO_x$ & $CO_2$ emissions rates. The map may receive the emission rates as inputs and outputs enhanced calibration values as multiple arrays of data.

In one example, the controller receives the rates from the data services, the engine adapts its overall calibration behavior/features using the implemented mapping function in the controller. The behavior is not only considering the emission rates but also other physical sensor information including temperature and pressure levels and other auxiliary data. The adoption of the calibration behavior by the controller depends on the propulsion system type and features. For example, the forced cylinder deactivation/activation in a gasoline engine, forced electrical mode switch in a hybrid powertrain, or forced min/max RPM limitations for all combustion based propulsion systems may be defined as adaption/behavior of the controller. Yet, these behaviors may be controlled without human interference in the low emissions zones however these would be on-demand outside of these zones, in other words, these behaviors would be under control of the driver when there is no high level restriction for example, in a city with regard to emission limits.

The drivers can have freedom to disable these calibration behaviors using a driving mode, such as a green mode, an eco-mode, a standard mode, and a sport mode. The green mode may differ from the eco mode in that the green mode is based on minimizing emissions and the eco mode is based on minimizing fuel consumption.

A database may collect the desired data with regard to the emissions such as live measurements of the emissions/fleet data etc., they can transmit these kind of information to the vehicle easily through the embedded modem. Yet, the controller of the vehicle may not include computing power to process large amounts of information. Therefore, it sends only a processed encoded information which is assigned by the emission map in the controller. This information may include emission rates ($NO_x$ and $CO_2$) rates but it does not actually include the emission rates but the definition a scaled multiple of arrays of data to configure the engine behavior according to the location of the vehicle e.g., emission zone/unpopulated area.

In order to deliver desired emission rates, the data center analyzes all the existing data using supervised machine learning algorithms such as Deep Neural Networks and Recurrent Neural Networks. In order to achieve desired predictions, it uses various data sources such as simulation, experiments, fleet vehicle data and live measurements to train the machine learning algorithms.

The machine learning algorithms are not directly running on the vehicle hardware. This is due to the fact that the additional AI processors would add to the costs and it would consume additional amount energy from the battery.

Turning now to FIG. 11, it shows a method 1100 for adjusting vehicle operating parameters based on outputs from a neural network. The outputs of the neural network are based on a plurality of data provided to an input layer of the neural network, wherein the plurality of data is received from a plurality of vehicles within a common geofenced area.

The method 1100 begins at 1102, which includes receiving feedback from the plurality of vehicles within the geofenced area. The processor of the network may be in communication with controllers of the plurality of vehicles within the geofenced area, wherein the feedback may be used as inputs. For vehicles free of a modem or other wireless communication device, Wi-Fi may be provided via nearby vehicles to allow the vehicles without the modem to communicate with the database. Additionally or alternatively, the vehicles may communicate with one another, wherein individual vehicles with a modem or other wireless communicate ability may communicate data from a plurality of vehicles to the database. Additionally or alternatively, in some examples, data from vehicles free of a controller or other computing device may be estimated via one or more of previous traffic patterns, traffic density, time of day, weather, location, and the like. Additionally or alternatively, visualization devices within the geofenced area and/or arranged on vehicles within the geofenced area may provide feedback with regard to vehicles without a controller or other processing device.

The method 1100 may proceed to 1104, which includes determining if a total $CO_2$ and a total $NO_x$ emissions are above respective thresholds in the geofenced area. A threshold $CO_2$ emissions and a threshold $NO_x$ emissions may be based on one or more of a legal restriction, the location, weather, time of day, and the like. For example, if a wind speed is less than a threshold wind speed, then the threshold $CO_2$ emissions and/or the threshold $NO_x$ emissions may be decreased. As another example, if the location is a city, then the threshold $NO_x$ emissions may be decreased and the threshold $CO_2$ emission may be increased.

If both the total $CO_2$ and the total $NO_x$ emissions are not above respective thresholds, then the method 1100 proceeds to 1106, which includes determining if only the total $NO_x$ emissions is above the threshold $NO_x$ emissions. If the total $NO_x$ emissions, determined via calculating $NO_x$ emissions from all the vehicles within the geofenced area, is less than or equal to the total $NO_x$ emissions, then the method 1100 may proceed to 1108, which includes determining that only the total $CO_2$ emissions are greater than a respective threshold (e.g., the threshold $CO_2$ emissions).

The method 1100 may proceed to 1110, which includes selecting a first plurality of vehicles to minimize $CO_2$ emissions. The first plurality of vehicles may be selected from the plurality of vehicles within the geofenced area based on one or more of a battery state-of-charge (SOC) being greater than a threshold SOC, a current $CO_2$ output being greater than an average $CO_2$ output, and a capability to decrease $CO_2$ emissions. The average $CO_2$ output may be based on an average $CO_2$ output of vehicles within the geofenced location. The capability to decrease $CO_2$ emissions may include the current $CO_2$ output of the vehicles being greater than a minimum $CO_2$ output of the vehicle. Additionally or alternatively, the capability to decrease $CO_2$ emissions may include the vehicle being configured to adjust operating parameters via feedback from the database.

The method 1100 may proceed to 1112, which includes adjusting parameters to decrease $CO_2$. The adjusting may include one or more of advancing an injection timing at 1114, increasing an air/fuel ratio (AFR) at 1116, decreasing fueling at 1118, increasing a battery SOC consumption at 1120, increasing a coasting frequency at 1122, and decreasing a maximum engine RPM 1124. The controller may receive instructions from the processor based on an output of the neural network to executed the adjustments to the operating parameters.

Advancing the injection timing may include the controller signaling to an actuator of a fuel injector to inject fuel earlier in a combustion cycle. Increasing the air/fuel ratio may include one or more of decreasing a fuel injection volume and increasing an air flow to a cylinder. Decreasing fueling may include decreasing a pulse-width provided to an injector at an opening of the injector or increasing a pulse-width provided to the injector at a closing of the injector. Increasing the battery SOC consumption may include increase a motive force provided by an electric motor, which is powered by the battery. In this way, the engine power output may be reduced as the battery SOC consumption is increased. It will be appreciated that increasing the battery SOC consumption may be instructed in response to a battery SOC being greater than a threshold SOC, wherein the threshold SOC is based on a lower battery SOC (e.g., less than 10% or less than 5% total charge). Increasing the coasting frequency may include increasing a number of opportunities in which the coasting may be executed such that entry conditions to a coasting event may include a greater number of operating conditions. Decreasing a max engine RPM may include decreasing the engine RPM to a value where $CO_2$ emissions are minimized (e.g., decreased max of 2,500 RPM).

By executing these adjustments, the $CO_2$ emissions of a first plurality of vehicles within the geofenced area may be reduced. Remaining vehicles, which may not be included within the first plurality of vehicles due to an inability to further reduce $CO_2$ emissions and/or due to an operator request to maintain a current level of driver demand may operate without adjustments. In this way, emissions from the first plurality of vehicles may continue to be reduced to offset emissions from the remaining vehicles within the geofenced area until either the threshold $CO_2$ emissions are reached or until total $CO_2$ emissions within the geofenced area reach a lowest possible value.

Returning to 1106, if the total $NO_x$ emissions are greater than the threshold $NO_x$ emissions, then the method 1100 may proceed to 1126, which includes selecting vehicles to minimize $NO_x$. A second plurality of vehicles may be selected based one or more of a battery state-of-charge (SOC) being greater than a threshold SOC, a current $NO_x$ output being greater than an average $NO_x$ output, and a capability to decrease $NO_x$ emissions. The average $NO_x$ output may be based on an average $NO_x$ output of vehicles within the geofenced location. The capability to decrease $NO_x$ emissions may include the current $NO_x$ output of the vehicles being greater than a minimum $NO_x$ output of the vehicle. Additionally or alternatively, the capability to decrease $NO_x$ emissions may include the vehicle being configured to adjust operating parameters via feedback from the database.

The method 1100 may proceed to 1128, which includes adjusting parameters to decrease $NO_x$. Adjusting parameters may include but are not limited to increasing EGR at 1130, decreasing air/fuel ratio at 1132, increasing fueling at 1134, increasing battery SOC consumption at 1136, increasing a start/stop frequency at 1138, and decreasing the maximum engine RPM at 1140. Increasing EGR may include adjusting a position of an EGR valve to a more open position. Decreasing the air/fuel ratio may include increasing air flow to the cylinder. Additionally or alternatively, fueling may be increased to decrease the air/fuel ratio. In this way, $NO_x$ may be reduced while $CO_2$ emissions may be increased. Increasing the start/stop frequency may include adjusting start/stop entry conditions such that a greater number of stop events may meet the start/stop entry conditions compared to before the adjustments.

In this way, $NO_x$ output of the second plurality of vehicles may be reduced to compensate for $NO_x$ output of the remaining vehicles. By doing this, $NO_x$ output within the geofenced area may be minimized.

Returning to 1104, if the total $CO_2$ emissions and the total $NO_x$ emissions are both greater than respective thresholds, then the method 1100 may proceed to 1142, which includes determining a plurality of third vehicles with a battery SOC greater than the threshold SOC.

The method 1100 may proceed to 1144, which includes signaling to the plurality of third vehicles to operate in an all-electric mode. In this way, vehicles that are capable of reducing both $NO_x$ and $CO_2$ emissions are signaled to do so by the database processor.

The method 1100 may proceed to 1146, which includes selecting a first plurality of vehicles to minimize $CO_2$ emissions, similar to 1110 described above.

The method 1100 may proceed to 1148, which includes adjusting parameters to decrease $CO_2$, similar to 1112-1124 described above.

The method 1100 may proceed to 1150, which includes selecting a second plurality of vehicles to minimize $NO_x$ emissions, similar to 1126 described above.

The method 1100 may proceed to 1152, which includes adjusting parameters in the second plurality of vehicles to decrease $NO_x$ emissions, as described above with respect to 1128-1140.

In this way, the method 1100 may minimize emissions from various vehicles by analyzing vehicles configurations within a shared geofenced area and relaying outputs from a trained neural network to controllers of a plurality of vehicles. The plurality of vehicles may be divided into a first plurality of vehicles, a second plurality of vehicles, a third plurality of vehicles, and a plurality of remaining vehicles. The first plurality of vehicles may be positioned to decrease $CO_2$ emissions based on a vehicle architecture and/or current operating parameters. The second plurality of vehicles may be positioned to decrease $NO_x$ emissions based on a vehicle architecture and/or current operating parameters. The third plurality of vehicles may be positioned to decrease both $CO_2$ and $NO_x$ emissions by entering an all-electric mode. The plurality of remaining vehicles may not reduce emissions due to a vehicle operator request to maintain a driver demand or due to absence of a controller and/or an ability to communicate with the database. In one example, emissions of the plurality of remaining vehicles may be estimated based on feedback from proximity and/or landscape sensors of the first, second, and third pluralities of vehicles. Additionally or alternatively, the emissions of the plurality of remaining vehicles may be estimated based on historical data including previous traffic flows corresponding to a time of day.

In this way, a computer cloud (e.g., a processor and a database) may receive data from a plurality of vehicles. The data may be sent to an input layer of a neural network, which may be transformed via a plurality of weights through a plurality of hidden layers prior to becoming an output of an output layer. The output may be used to adjust operating parameters of one or more of the plurality of vehicles. The neural network may then be updated (e.g., trained) by continuously receiving data and updating weights used in the hidden layers to generate new outputs that may provide real-world results closer to desired results. In this way, as the neural network is trained, adjustments to the plurality of vehicles may result in reduced emissions operating parameters, thereby meeting emission zone limits.

The technical effect of adjusting engine operating parameters based on outputs from the neural network is to meet emissions regulations for various emissions zones. The adjusting includes adjusting signal to actuators of various components of the vehicle based on the outputs provided from the neural network to the controller to the vehicle.

An embodiment of a computer-implemented method for creating a trained artificial neural network (TKNN) that can be used to predict emission data of a vehicle based on vehicle data, includes creating multiple training data sets (TDS), wherein each training data set (TDS) includes at least one vehicle datum and one emission datum associated with that vehicle datum, and training an artificial neural network (KNN) with the training data sets (TDS). A first example of the method further includes where each training data set (TDS) includes data selected from vehicle fleet data, simulation data, experimental data, and live data. A second example of the method, further includes a first example, further includes where a forward-facing propagation and a back propagation with a loss function are performed during the training. A third example of the method, further including one or more of the previous examples, further includes where predicting emission data of a vehicle based on vehicle data, wherein the vehicle data include location data, via a trained artificial neural network (TTKNN), which is a result of training an artificial neural network (KNN). A fourth example of the method, further including one or more of the previous examples, further includes where the vehicle data and predicted emission data are used to create training data sets and to train the artificial neural network (KNN). A fifth example of the method, further including one or more of the previous examples, further includes where the artificial neural network (KNN, TKNN) is a deep neural network or a recurrent neural network. A sixth example of the method, further including one or more of the previous examples, further includes where the data are processed by filtering, normalizing and/or scaling. A seventh example of the method, further including one or more of the previous examples, further includes where calibration values of a vehicle engine are determined based on emission data predicted. An eighth example of the method, further including one or more of the previous examples, further includes where the predicted emission data are compared with emission limit values and when the emission limit values are exceeded, the calibration values are determined in such a way that the emission limits are no longer exceeded when operating the vehicle engine with the determined calibration values. A ninth example of the method, further including one or more of the previous examples, further includes where the vehicle engine is automatically controlled by means of the determined calibration values if the vehicle is within a specified geographical region. A tenth example of the method, further including one or more of the previous examples, further includes where the vehicle issues a notification if it is outside a specified geographical region.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a plurality of hybrid vehicles each comprising an engine and an electric motor, each hybrid vehicle further comprising a modem, a global positioning system (GPS) device, and a controller; and
an online database comprising a processor and memory; the online database in communication with each controller;
wherein each controller comprises instructions stored on memory thereof that when executed cause each controller to:
receive feedback from a plurality of sensors of each respective hybrid vehicle;
relay the feedback to the processor;
receive outputs from the processor; and
control each respective hybrid vehicle based on the received outputs;
wherein the memory of the online database comprises instructions that when executed cause the processor to:
identify hybrid vehicles of the plurality of hybrid vehicles within a geofenced area;
receive the feedback from the plurality of hybrid vehicles;
determine, based on the feedback, that a total $CO_2$ emissions in the geofenced area is greater than a first threshold and that a total NOx emissions in the geofenced area is greater than a second threshold;
select a first subset of the hybrid vehicles to reduce $CO_2$ emissions based on, for each hybrid vehicle of the first subset, a battery state-of-charge (SOC) being greater than a first threshold SOC, a current $CO_2$ output being greater than an average $CO_2$ output of the plurality of hybrid vehicles within the geofenced area, and a capability to decrease $CO_2$ emissions;
generate and send first outputs causing the first subset of hybrid vehicles to adjust first parameters to reduce $CO_2$ emissions;
select a second subset of the hybrid vehicles to reduce NOx emissions based on, for each hybrid vehicle of the second subset, a battery SOC being greater than a second threshold SOC, a current NOx output being greater than an average NOx output of the plurality of hybrid vehicles within the geofenced area, and a capability to decrease NOx emissions;
generate and send second outputs causing the second subset of hybrid vehicles to adjust second parameters to reduce NOx emissions;
select a third subset of the hybrid vehicles to reduce both NOx and $CO_2$ emissions based on a battery SOC of each vehicle of the third subset being greater than a third threshold SOC; and
generate and send third outputs causing the third subset of hybrid vehicles to deactivate engines and operate the third subset in all-electric mode to reduce both $NO_x$ and $CO_2$ emissions.

2. The system of claim 1, wherein the memory of the online database further comprises instructions that when executed cause the processor to:
apply the feedback to nodes of an input layer of a neural network;
receive outputs from nodes of an output layer of the neural network; and
relay the outputs to the controllers.

3. The system of claim 1, wherein the first plurality of vehicles receives outputs from the processor signaling to increase fueling, and wherein the second plurality of vehicles receive outputs from the processor signaling to decrease fueling, and wherein the third plurality of vehicles receive outputs from the processor signaling to switch to an all-electric mode.

4. The system of claim 2, wherein the third plurality of vehicles are selected based on a hybrid architecture and a battery SOC being greater than the third threshold SOC.

5. A method for adjusting the powertrain of a plurality of hybrid vehicles, the method comprising:
identifying, via a plurality of global positioning system (GPS) devices, the plurality of hybrid vehicles each comprising an engine, an electric motor, a modem, and a GPS device of the plurality of GPS devices within a geofenced area;
receiving, via a computing cloud network, data from the plurality of hybrid vehicles within the geofenced area;
determining, based on the received data, that a total $CO_2$ emissions in the geofenced area is greater than a first threshold and that a total $NO_x$ emissions in the geofenced area is greater than a second threshold;
selecting a first subset of the plurality of hybrid vehicles to reduce $CO_2$ emissions based on, for each vehicle of the first subset of the plurality of hybrid vehicles, a battery state-of-charge (SOC) of each vehicle of the first subset of the plurality of hybrid vehicles being greater than a first threshold SOC, a current $CO_2$ output being greater than an average $CO_2$ output of the plurality of hybrid vehicles, and a capability to decrease $CO_2$ emissions;
adjusting first parameters of the first subset of the plurality of hybrid vehicles to reduce $CO_2$ emissions;
selecting a second subset of the plurality of hybrid vehicles to reduce $NO_x$ emissions based on, for each vehicle of the second subset of the plurality of hybrid vehicles, a battery SOC of each vehicle of the second subset of the plurality of hybrid vehicles being greater than a second threshold SOC, a current $NO_x$ output being greater than an average $NO_x$ output of the plurality of hybrid vehicles, and a capability to decrease $NO_x$ emissions;
adjusting second parameters of the second subset of the plurality of hybrid vehicles to reduce $NO_x$ emissions;
selecting a third subset of the plurality of hybrid vehicles to reduce both $NO_x$ and $CO_2$ emissions based on a battery SOC of each vehicle of the third subset of the plurality of hybrid vehicles being greater than a third threshold SOC; and
deactivating the engine of each vehicle of the third subset of the plurality of hybrid vehicles and operating the third subset of the plurality of hybrid vehicles in an all-electric mode to reduce both $NO_x$ and $CO_2$ emissions.

6. The method of claim 5, wherein adjusting the first parameters of the first subset of the plurality of hybrid vehicles comprises decreasing a fuel injection volume, advancing a fuel injection timing, increasing an air/fuel ratio, increasing a battery SOC consumption, increasing a coasting frequency, and decreasing a maximum engine RPM.

7. The method of claim 5, wherein adjusting the second parameters of the second subset of the plurality of hybrid vehicles comprises increasing the fuel injection volume, retarding the fuel injection timing, decreasing the air/fuel ratio, increasing an EGR flow rate, increasing a battery SOC consumption, and decreasing the maximum engine RPM.

8. The method of claim 5, wherein selecting the third subset of the plurality of hybrid vehicles includes selecting vehicles of the plurality of hybrid vehicles in which a battery SOC is greater than the third threshold SOC and a battery SOC of the first subset of the plurality of hybrid vehicles and the second subset of the plurality of hybrid vehicles is less than the third threshold SOC.

9. The method of claim 5, wherein the first threshold and the second threshold are based on respective legal restrictions.

* * * * *